(12) United States Patent
Nakasone et al.

(10) Patent No.: US 11,466,774 B2
(45) Date of Patent: Oct. 11, 2022

(54) HYDRAULIC CONTROL DEVICE

(71) Applicant: Honda Motor Co., Ltd., Tokyo (JP)

(72) Inventors: Makito Nakasone, Saitama (JP); Koji Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 173 days.

(21) Appl. No.: 17/094,831

(22) Filed: Nov. 11, 2020

(65) Prior Publication Data

US 2021/0140538 A1 May 13, 2021

(30) Foreign Application Priority Data

Nov. 12, 2019 (JP) .............................. JP2019-205046

(51) Int. Cl.
*F16H 61/00* (2006.01)
*F16H 61/662* (2006.01)

(52) U.S. Cl.
CPC ....... *F16H 61/0031* (2013.01); *F16H 61/662* (2013.01)

(58) Field of Classification Search
CPC ............... F16H 61/0031; F16H 61/662; F16H 61/4008; F16H 61/44; F16H 61/4192
See application file for complete search history.

(56) References Cited

U.S. PATENT DOCUMENTS

| 2015/0027570 A1* | 1/2015 | Wi | F15B 11/17 137/565.13 |
|---|---|---|---|
| 2019/0048898 A1* | 2/2019 | Harada | F16H 61/0031 |
| 2019/0048899 A1* | 2/2019 | Hirai | F04C 14/12 |
| 2020/0131735 A1* | 4/2020 | Kim | F15B 15/202 |

FOREIGN PATENT DOCUMENTS

| CN | 107429822 | 12/2017 |
|---|---|---|
| CN | 109386512 | 2/2019 |
| CN | 109386602 | 2/2019 |
| CN | 109386605 | 2/2019 |
| JP | 2014047802 | 3/2014 |
| JP | 2015200369 | 11/2015 |
| JP | 2019035428 | 3/2019 |

OTHER PUBLICATIONS

Office Action of China Counterpart Application, with English translation thereof, dated Nov. 23, 2021, pp. 1-14.
"Office Action of Japan Counterpart Application" with English translation thereof, dated Aug. 2, 2022, p. 1-p. 8.

* cited by examiner

*Primary Examiner* — David J Hlavka
(74) *Attorney, Agent, or Firm* — JCIPRNET

(57) ABSTRACT

In a hydraulic control device switchable between a first state in which a first oil is supplied from a first pump to a hydraulic operation part via a bypass valve and a second state in which the first oil supplied from the first pump is pressurized by using the second pump and the pressurized first oil is supplied, as a second oil, to the hydraulic operation part, when the second pump is stopped in the second state, control that gradually decreases a target rotation speed of the second pump is performed, and rates at which the target rotation speed of the second pump decreases differ in a case where the second pump is stopped in an operation-allowed region and in a case where the second pump is stopped when the second pump is determined as in an operation-disallowed region.

12 Claims, 11 Drawing Sheets

HYDRAULIC CONTROL DEVICE

CROSS-REFERENCE TO RELATED APPLICATION

This application claims the priority benefit of Japan application serial no. 2019-205046, filed on Nov. 12, 2019. The entirety of the above-mentioned patent application is hereby incorporated by reference herein and made a part of this specification.

BACKGROUND

Technical Field

The disclosure relates to a hydraulic control device in which a second pump and a bypass valve are connected in parallel between a first pump and a hydraulic operation part, and which supplies a first oil from the first pump to the hydraulic operation part via the bypass valve, or which pressurizes the first oil by using the second pump and supplies the pressurized first oil as a second oil to the hydraulic operation part.

Description of Related Art

For example, Patent Document 1 discloses a hydraulic control device of a vehicle transmission in which a second pump (electric pump) and a bypass valve (check valve) operated by the drive of a motor are connected in parallel between a first pump (mechanical pump) and a hydraulic operation part of the transmission. In this case, when the engine is started, first, a first oil is supplied from the first pump to the hydraulic operation part via the bypass valve (first state). After that, the second pump is driven by the drive of the motor, and the first oil supplied from the first pump is pressurized by the second pump, and the pressurized first oil is supplied as the second oil from the second pump to the hydraulic operation part (second state). The hydraulic operation part includes, for example, an oil chamber of a pulley (drive pulley and driven pulley) of a belt-type continuously variable transmission.

In the hydraulic control device having the above configuration, switching between the first state in which the first oil is supplied to the hydraulic operation part (continuously variable transmission) and the second state in which the second oil is supplied is performed by opening and closing the bypass valve. That is, when the discharge amount (flow rate) of the second oil from the second pump exceeds the flow rate (discharge amount of the first oil from the first pump) of the first oil passing through the bypass valve, the hydraulic pressure (line pressure PH) in the downstream oil passage of the bypass valve becomes higher than the hydraulic pressure (output pressure P1) in the upstream oil passage. In this way, the bypass valve is closed, and the supply of the first oil from the first pump to the hydraulic operation part via the bypass valve is switched to the supply of the second oil from the second pump to the hydraulic operation part. As a result, the flow of the first oil to the oil passage is blocked, and the second oil is pumped to the hydraulic operation part by the second pump. On the other hand, when the discharge amount of the second pump is reduced due to the stop or the low rotation state of the second pump, the bypass valve is open, and the first oil is supplied to the hydraulic operation part.

However, in the hydraulic control device with the above configuration, even though the second pump is stopped to switch the second state to the first state, at the time of stopping the second pump, if the target rotation speed is lowered at a large rate, there is a concern that the fuel efficiency deteriorates due to the drastic decrease of the hydraulic pressure of the oil supplied to the hydraulic operation part. Meanwhile, in the case where the second pump is determined as in an operation-disallowed region from the perspective such as operation condition, performance, etc., it is necessary quickly stop the second pump to shorten the operation time in the operation-disallowed region. Therefore, at the time of stopping the second pump, it requires a solution for suitably controlling the rotation speed of the second pump in response to the operation state of the second pump.

PRIOR ART DOCUMENT

Patent Document

Patent Document 1: Japanese Laid-open No. 2015-200369

The disclosure provides a hydraulic control device capable of suitably controlling a rotation speed at a time of stopping a second pump in response to an operation state of the second pump.

SUMMARY

In a hydraulic control device of the disclosure, a bypass valve (58) and a second pump (30) driven by a motor (32) are connected in parallel between a first pump (20) and a hydraulic operation part (56) of a transmission. The hydraulic control device is configured to be switchable between a first state and a second state. In the first state, a first oil is supplied from the first pump (20) to the hydraulic operation part (56) via the bypass valve (58). In the second state, the first oil supplied from the first pump (20) is pressurized by using the second pump (30), and the first oil that pressurized is as a second oil and supplied to the hydraulic operation part (56). When the second pump (30) is stopped in the second state, a control that gradually decreases a target rotation speed (NA) of the second pump (30) is performed, and rates at which the target rotation speed (NA) of the second pump (30) decreases differ in a case where the second pump (30) is stopped in an operation-allowed region and in a case where the second pump (30) is stopped when the second pump is determined as in an operation-disallowed region.

In addition, it may be that, in such situation, compared with the case where the second pump (30) is stopped in the operation-allowed region, the rate at which the target rotation speed (NA) of the second pump (30) decreases is greater in the case where the second pump (30) is stopped when the second pump (30) is determined as in the operation-disallowed region.

In addition, in the hydraulic control device of the disclosure, it may be that a determination on whether the second pump (30) is in the operation-disallowed region is performed based on a size relationship between a hydraulic pressure of dischargeable oil of the second pump (30) and a differential pressure between an estimated value of a pressure value (PH) of oil supplied to the hydraulic operation part (56) and an estimated value of a pressure value (P3) of oil supplied from the first pump (20) to another hydraulic operation part (114) or a lubrication target (108) which operates at a pressure lower than that of the hydraulic operation part (56).

In this case, it may be that the second pump (30) is determined as in the operation-disallowed region in a case where the hydraulic pressure of the dischargeable oil of the second pump (30) is equal to or less than the differential pressure between the estimated value of the pressure value (PH) of the oil supplied to the hydraulic operation part (56) and the estimated value of the pressure value (P3) of the oil supplied from the first pump (20) to the another hydraulic operation part (114) or the lubrication target (108) which operates at the pressure lower than that of the hydraulic operation part.

In addition, the hydraulic control device may further include a hydraulic pressure sensor (26) that detects a pressure (P1) of oil on a sucking side of the first oil in the second pump (30), and based on a determination that an oil pressure (P1) detected by the hydraulic pressure sensor (26) has increased to a value substantially consistent with the estimated value of the pressure value (PH) of the oil supplied to the hydraulic operation part (56), the control that gradually decreases the target rotation speed (NA) of the second pump (30) ends, and the target rotation speed (NA) of the second pump (30) is decreased until a substantial stop rotation speed (N2).

DESCRIPTION OF THE EMBODIMENTS

Figure 1:
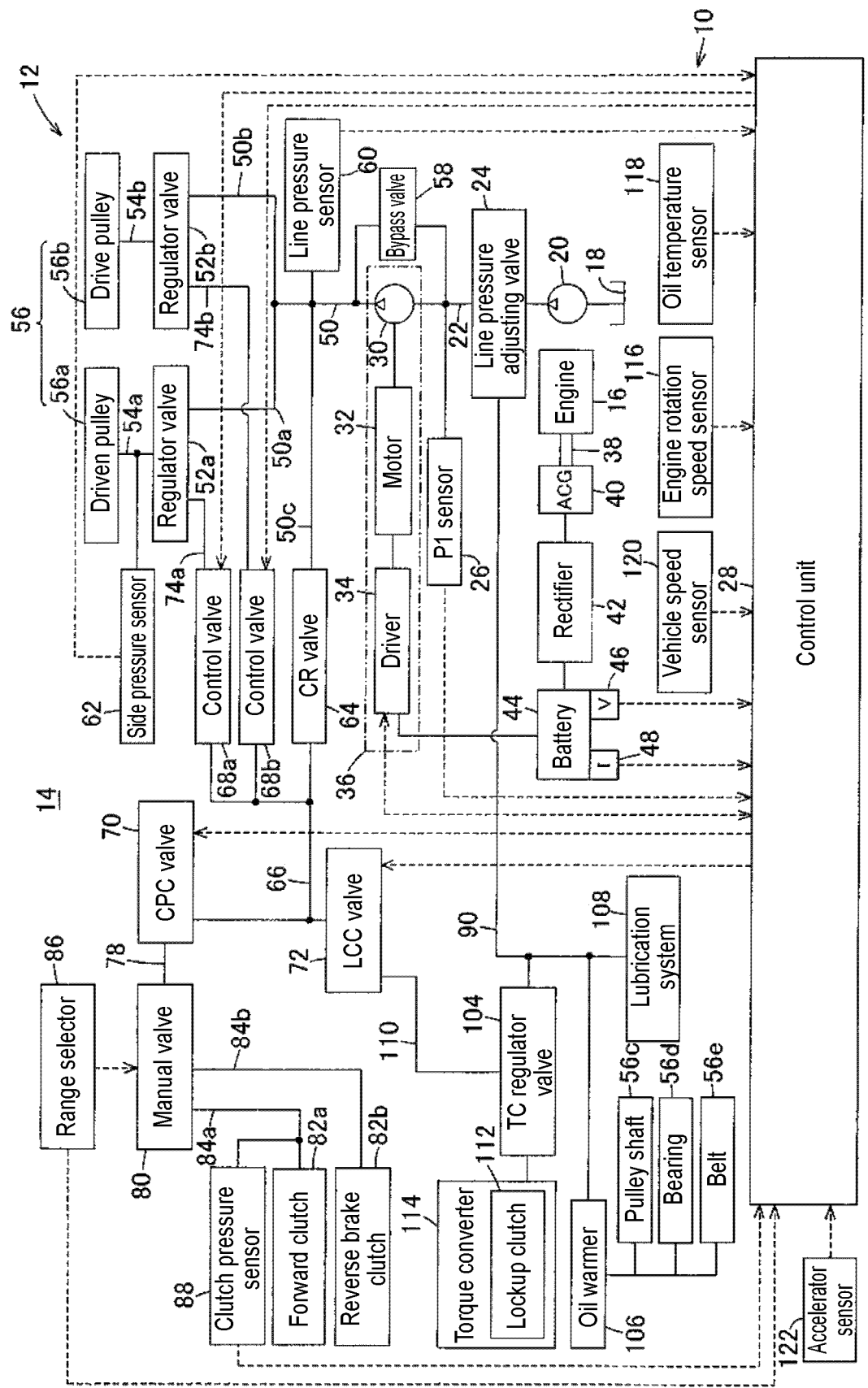
FIG. 1 is a configuration diagram of a hydraulic control device according to an embodiment of the disclosure.

According to the hydraulic control device of the disclosure, in the case where the second pump is stopped in the operation-allowed region, by making the rate at which the rotation speed of the second pump decreases smaller, the fuel efficiency of the vehicle can be facilitated. Meanwhile, in the case where the second pump is determined as in the operation-disallowed region, by making the rate at which the target rotation speed of the second pump decreases greater than the rate in the case where the second pump is stopped in the operation-allowed region, the rotation speed of the second pump can decrease earlier to ensure the hydraulic function of the hydraulic operation part. Accordingly, by making the rates at which the rotation speed of the second pump decreases different in the case where the second pump is stopped in the operation-allowed region and the case where the second pump is determined as in the operation-disallowed region, the fuel efficiency of the vehicle can be facilitated, while the hydraulic function of the hydraulic operation part can be ensured.

In the case where the hydraulic pressure of the dischargeable oil of the second pump is equal to or less than the differential pressure between the estimated value of the pressure value of the oil supplied to the hydraulic operation part and the estimated value of the pressure value of the oil supplied from the first pump to the another hydraulic operation part or the lubrication target which operates at the pressure lower than that of the hydraulic operation part, since the hydraulic pressure corresponding to the differential pressure cannot be covered by the operation of the second pump, the concern that the energy efficiency cannot be improved through the operation of the second pump arises. Therefore, in such case, by determining the second pump as in the operation-disallowed region, the control that stops the second pump is performed at an earlier stage.

In the case where the oil pressure detected by the hydraulic pressure sensor is determined as having increased to a value substantially consistent with the estimated value of the pressure value of the oil supplied to the hydraulic operation part, the hydraulic pressure required by the hydraulic operation part can be covered by the operation of the first pump alone. Therefore, in such case, the control that gradually decreases the target rotation speed of the second pump ends by decreasing the target rotation speed of the second pump until the substantial stop rotation speed. Accordingly, the stop period of the second pump can be suitably determined, and it is possible to facilitate the fuel efficiency.

The reference numerals in parentheses above indicate the drawing reference numbers of the corresponding components in the embodiments described later for reference.

According to the hydraulic control device of the disclosure, the rotation speed at the time of stopping the second pump can be suitably controlled in response to the operation state of the second pump.

Hereinafter, embodiments of the disclosure will be described with reference to the accompanying drawings. FIG. 1 is a configuration diagram of a hydraulic control device according to an embodiment of the disclosure. A hydraulic control device 10 shown in FIG. 1 is applied to, for example, a vehicle 14 equipped with a transmission 12 which is a continuously variable transmission (CVT).

The hydraulic control device 10 has a first pump (mechanical pump) 20 that is driven by an engine 16 of the vehicle 14 and pumps up and delivers oil (hydraulic oil) stored in a reservoir 18. An oil passage 22 for flowing the oil pumped from the first pump 20 as a first oil is connected to the output side of the first pump 20. A line pressure adjusting valve (pressure adjusting valve) 24, which is a spool valve, is provided in the middle of the oil passage 22.

In the oil passage 22, an output pressure sensor (P1 sensor) 26 is disposed on the downstream side of the line pressure adjusting valve 24. The output pressure sensor 26 is a hydraulic sensor which sequentially detects the pressure (output pressure of the first pump 20) P1 of the first oil flowing through the oil passage 22, and which sequentially outputs a detection signal indicating the detected output pressure P1 to a control unit 28 (to be described later). Further, a second pump 30 having a capacity smaller than that of the first pump 20 is connected to the downstream side of the oil passage 22.

The second pump 30 is an electric pump which is driven by the rotation of a motor 32 provided in the vehicle 14 and which outputs the first oil supplied through the oil passage 22 as a second oil. In this case, the second pump 30 can pressurize the supplied first oil and pump the pressurized first oil as the second oil. The motor 32 rotates under the control of a driver 34. The driver 34 controls the drive of the motor 32 based on the control signal supplied from the control unit 28, and sequentially outputs a signal indicating the drive state of the motor 32 (for example, the rotation speed Nem of the motor 32 according to the rotation speed Nep of the second pump 30) to the control unit 28. An electric pump unit 36 is configured by the second pump 30, the motor 32, and the driver 34.

In addition, an ACG (alternating current generator) 40 is connected to a crankshaft 38 of the engine 16. The ACG 40 generates power by rotation of the crankshaft 38 due to the drive of the engine 16. The AC power generated by the ACG 40 is rectified by a rectifier 42 and charged into a battery 44. The battery 44 is provided with a voltage sensor 46 which detects a voltage V of the battery 44 and a current sensor 48 which detects a current I flowing from the battery 44. The voltage sensor 46 sequentially detects the voltage V of the battery 44, and sequentially outputs a detection signal indicating the detected voltage V to the control unit 28. The current sensor 48 sequentially detects the current I flowing from the battery 44, and sequentially outputs a detection signal indicating the detected current I to the control unit 28. The driver 34 is driven by the power supply from the battery 44.

An oil passage 50 is connected to the output side of the second pump 30. The oil passage 50 is branched into two oil passages 50*a* and 50*b* on the downstream side. One oil passage 50*a* is connected to a driven pulley 56*a*, which configures a belt-type continuously variable transmission mechanism 56 of the transmission 12 via a regulator valve 52*a* and an oil passage 54*a*. The other oil passage 50*b* is connected to a drive pulley 56*b* configuring the continuously variable transmission mechanism 56 via a regulator valve 52*b* and an oil passage 54*b*.

A bypass valve 58 is connected in parallel with the second pump 30 between the two oil passages 22 and 50. The bypass valve 58 is a check valve provided so as to bypass the second pump 30, and allows the flow of oil (first oil) from the oil passage 22 on the upstream side to the oil passage 50 on the downstream side, while blocking the flow of oil (second oil) from the oil passage 50 on the downstream side to the oil passage 22 on the upstream side.

Further, the oil passage 54*a* is provided with a side pressure sensor 62 as a hydraulic sensor for detecting the pressure PDN (the pulley pressure which is the side pressure of the driven pulley 56*a*) of the oil supplied to the driven pulley 56*a*.

A CR valve 64 is connected to the downstream side of an oil passage 50*c* branching from the oil passage 50. The upstream side of the CR valve 64 is connected to the oil passage 50*c*, and the downstream side thereof is connected to two control valves 68*a* and 68*b*, a CPC valve 70 and an LCC valve 72 via an oil passage 66. The CR valve 64 is a pressure reducing valve which decompresses the oil (second oil) supplied from the oil passage 50*c*, and supplies the decompressed oil to the control valves 68*a* and 68*b*, the CPC valve 70, and the LCC valve 72 via the oil passage 66.

Each of the control valves 68*a* and 68*b* is a normally open type solenoid valve having a solenoid, and is in a valve closed state while the control signal (current signal) is supplied from the control unit 28 and the solenoid is energized, and is in a valve open state when the solenoid is not energized.

Figure 2:
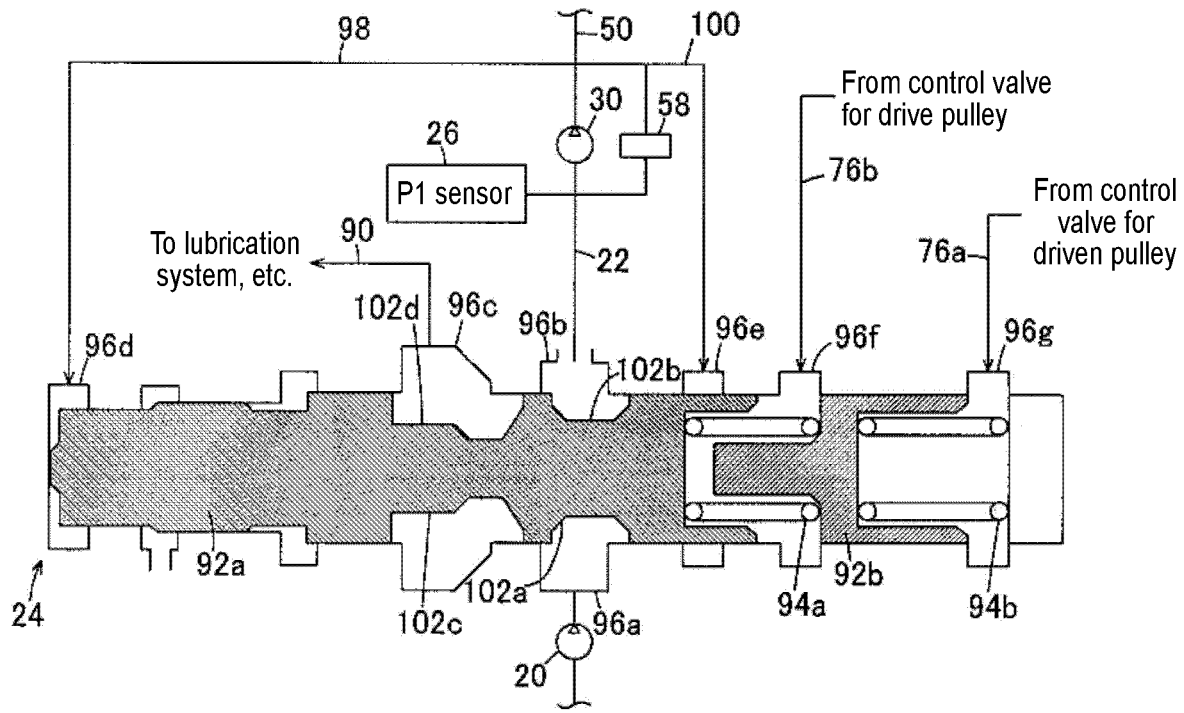
FIG. 2 is a configuration diagram of the line pressure adjusting valve.

One control valve 68*a* is a solenoid valve for the driven pulley 56*a*, and in the valve open state, the control valve 68*a* supplies the oil supplied from the CR valve 64 via the oil passage 66 to the regulator valve 52*a* via an oil passage 74*a* and also to the line pressure adjusting valve 24 via an oil passage 76*a* (see FIG. 2). In FIG. 1, for convenience, the oil passage 76*a* is not shown.

Further, the other control valve 68*b* is a solenoid valve for the drive pulley 56*b*, and in the valve open state, the control valve 68*b* supplies the oil supplied from the CR valve 64 via the oil passage 66 to the regulator valve 52*b* via an oil passage 74*b* and also to the line pressure adjusting valve 24 via an oil passage 76*b* (see FIG. 2). In addition, the oil passage 76*b* is also omitted in FIG. 1 for convenience.

Therefore, in one regulator valve 52*a*, the pressure of the oil supplied from the control valve 68*a* via the oil passage 74*a* is used as a pilot pressure, and when the line pressure PH of the oil supplied via the oil passages 50 and 50*a* is greater than or equal to the predetermined pressure, the valve is opened and the oil is supplied to the driven pulley 56*a* via the oil passage 54*a*. Further, in the other regulator valve 52*b*, the pressure of the oil supplied from the control valve 68*b* via the oil passage 74*b* is used as a pilot pressure, and when the line pressure PH of the oil supplied via the oil passages 50 and 50*b* is greater than or equal to the predetermined pressure, the valve is in the valve open state, and the oil is supplied to the drive pulley 56*b* via the oil passage 54*b*.

In addition, the control valve 68*a* can adjust the pressure of the oil output to the oil passages 74*a* and 76*a*. Further, the control valve 68*b* can adjust the pressure of the oil output to the oil passages 74*b* and 76*b*.

The upstream side of the CPC valve 70 is connected to the oil passage 66, and the downstream side thereof is connected to a manual valve 80 via an oil passage 78. The CPC valve 70 is a solenoid valve for a forward clutch 82*a* and a reverse brake clutch 82*b*. In this case, while the control signal is supplied from the control unit 28 and the solenoid is energized, the CPC valve 70 is in the valve open state, and the oil passages 66 and 78 are communicated with each other, and the oil is supplied to the manual valve 80.

The upstream side of the manual valve 80 is connected to the oil passage 78, the downstream side thereof is connected to the forward clutch 82*a* via an oil passage 84*a*, and is connected to the reverse brake clutch 82*b* via an oil passage 84*b*. The manual valve 80 is a spool valve, and when a driver operates a range selector 86 provided near the driver's seat of the vehicle 14 to select any one of the shift ranges such as P (parking), R (reverse), N (neutral), and D (forward, drive), in the manual valve 80, a spool (not shown) moves for a predetermined amount in the axial direction according to the selected shift range. In this way, the manual valve 80 enables the vehicle 14 to travel in the forward direction by supplying the oil supplied via the oil passage 78 to the forward clutch 82*a* via the oil passage 84*a*, or enables the vehicle 14 to travel in the reverse direction by supplying the oil to the reverse brake clutch 82*b* via the oil passage 84*b*. A clutch pressure sensor 88 for detecting the pressure (clutch pressure) of the oil supplied to the oil passage 84*a* is provided in the middle of the oil passage 84*a*.

A low-pressure hydraulic operation part to which the first oil is supplied via an oil passage 90 is connected to the oil passage 90 that branches from the oil passage 22 via the line pressure adjusting valve 24. A TC regulator valve 104 and an oil warmer 106 are connected to the downstream side of the oil passage 90 as the low-pressure hydraulic operation part, and a lubrication system 108 of the transmission 12 is connected as a lubrication target. The TC regulator valve 104 is connected to the LCC valve 72 via an oil passage 110, and a torque converter 114 incorporating a lockup clutch 112 is connected to the downstream side thereof.

The LCC valve 72 is a solenoid valve for the lockup clutch 112, and while the control signal is supplied from the control unit 28 and the solenoid is energized, the LCC valve 72 is in the valve open state, and the oil passages 66 and 110 are communicated with each other to supply the oil to the TC regulator valve 104. The TC regulator valve 104 is a spool valve, and the spool (not shown) operates in the axial direction in response to the pressure of the oil supplied from the LCC valve 72 via the oil passage 110, whereby a third oil supplied via the oil passage 90 is decompressed, and the decompressed third oil is supplied to the torque converter 114 and the lockup clutch 112.

The oil warmer 106 warms the third oil supplied from the oil passage 90 to a predetermined temperature, and supplies the warmed third oil to a pulley shaft 56*c*, a bearing 56*d*, and a belt 56*e* that configure the continuously variable transmission mechanism 56. Further, the lubrication system 108 is various lubrication targets such as bearings and gears that configure the transmission 12.

The hydraulic control device 10 further includes an engine rotation speed sensor 116, an oil temperature sensor 118, a vehicle speed sensor 120, an accelerator sensor 122, and the control unit 28. The engine rotation speed sensor 116 sequentially detects the engine rotation speed New of the engine 16 according to the rotation speed Nmp of the first pump 20, and sequentially outputs a detection signal indicating the detected engine rotation speed New (rotation speed Nmp) to the control unit 28. The oil temperature sensor 118 sequentially detects the temperature (oil temperature) To of the first oil or the second oil, and sequentially outputs a detection signal indicating the detected oil temperature To to the control unit 28. The vehicle speed sensor 120 sequentially detects the vehicle speed Vs of the vehicle 14, and sequentially outputs a detection signal indicating the detected vehicle speed Vs to the control unit 28. The accelerator sensor 122 sequentially detects the opening degree of an accelerator pedal (not shown) operated by the driver, and sequentially outputs a detection signal indicating the detected opening degree to the control unit 28.

The control unit 28 is a microcomputer such as a CPU which functions as a TCU (transmission control unit) which controls the transmission 12 or an ECU (engine control unit) which controls the engine 16. Then, the control unit 28 executes various controls on the hydraulic control device by reading and executing programs stored in a storage unit (not shown).

[Line Pressure Adjusting Valve 24]

FIG. 2 is a configuration diagram of the line pressure adjusting valve 24. The line pressure adjusting valve 24 is a spool valve incorporating a first spool 92*a* and a second spool 92*b*. The first spool 92*a* is a relatively long valve body having a substantially I-shaped cross section, and is disposed inside the line pressure adjusting valve 24 along the axial direction (left-right direction in FIG. 2). The second spool 92*b* is a spool having a substantially Y-shaped cross section, which is shorter than the first spool 92*a*, and is disposed inside the line pressure adjusting valve 24 on the right side of the first spool 92*a* along the axial direction. In this case, a first elastic member 94*a* is inserted between the first spool 92*a* and the second spool 92*b*, and the first elastic member 94*a* urges the first spool 92*a* to the left direction in FIG. 2. Further, the second spool 92*b* is urged toward the first spool 92*a* side by a second elastic member 94*b* disposed on the right side of the second spool 92*b*.

The line pressure adjusting valve 24 has first to seventh ports 96*a* to 96*g*. The first port 96*a* and the second port 96*b* are provided so as to face each other at the central part of the outer peripheral surface of the line pressure adjusting valve 24. Further, the first port 96*a* and the second port 96*b* are communicated with each other regardless of the position of the first spool 92*a* through a groove and the like (not shown) formed on the inner peripheral surface side of the line pressure adjusting valve 24 around the axial direction, and configures a part of the oil passage 22. In this case, the first port 96*a* is an inlet port for the first oil in the line pressure adjusting valve 24, and the second port 96*b* is an outlet port for the first oil.

Then, with the position of the second port 96*b* on the outer peripheral surface of the line pressure adjusting valve 24 as the center, the third port 96*c* and the fourth port 96*d* are sequentially provided on the left side of FIG. 2 so as to be separated from the second port 96*b*, while the fifth to seventh ports 96*e* to 96*g* are sequentially provided on the right side of FIG. 2 so as to be separated from the second port 96*b*.

The third port 96*c* is provided adjacent to the left side of the second port 96*b*, and the oil passage 90 is connected to the third port 96*c*. The fourth port 96*d* is provided at the left end of the line pressure adjusting valve 24, and is connected to the oil passage 50 via an oil passage 98. The fifth port 96*e* is provided adjacent to the right side of the second port 96*b*, and is connected to the oil passage 50 via an oil passage 100. In addition, in FIG. 1, for convenience, the oil passages 98 and 100 are not shown. The sixth port 96*f* is provided on the right side of the fifth port 96*e* and is connected to the oil passage 76*b*. The seventh port 96*g* is provided at the right end of the line pressure adjusting valve 24 and is connected to the oil passage 76*a*.

Therefore, oil (first oil or second oil) having the line pressure PH flowing through the oil passage 50 is supplied to the fourth port 96*d* and the fifth port 96*e* via the oil passages 98 and 100, respectively. Further, the oil is supplied from the control valve 68*b* to the sixth port 96*f* via the oil passage 76*b*. Moreover, the oil is supplied from the control valve 68*a* to the seventh port 96*g* via the oil passage 76*a*.

On the outer peripheral surface of the first spool 92*a*, by forming grooves in the parts facing the first port 96*a* and the second port 96*b* around the axial direction, the part facing the first port 96*a* is formed as a recess 102*a*, and the part facing the second port 96*b* is formed as a recess 102*b*.

Further, on the outer peripheral surface of the first spool 92a, a recess 102c adjacent to the recess 102a and a recess 102d adjacent to the recess 102b are formed by forming grooves in the parts facing the third port 96c around the axial direction.

Further, in the line pressure adjusting valve 24, the pressure (line pressure PH, output pressure P1) of the oil supplied to the fourth port 96d is greater than the pressure of the oil supplied to the sixth port 96f and the seventh port 96g. However, since the oil contact areas of the valves are different, the pressures are balanced, and when the oil with a pressure higher than the balance point is supplied to the fourth port 96d, the first spool 92a moves to the right side in FIG. 2 due to the line pressure PH against the elastic force of the first elastic member 94a and the pressure of the oil supplied to the sixth port 96f. As a result, the recess 102c and the first port 96a communicate with each other, and the first oil can flow into the oil passage 90 via the first port 96a, the recesses 102c and 102d, and the third port 96c. Further, in the line pressure adjusting valve 24, the pressure of the first oil flowing through the oil passage 90 may be less than the output pressure P1 of the first oil flowing through the second pump 30 and the bypass valve 58 via the oil passage 22. Therefore, in the following description, the first oil flowing through the oil passage 90 may be referred to as the third oil.

Next, the operation of the hydraulic control device 10 according to the embodiment configured as described above will be described. Here, a case will be described in which the control unit 28 drives and controls the second pump 30 by performing the feedback control on the motor 32 mainly using the output pressure P1 of the first pump 20 or the line pressure PH (estimated value) (to be described later).

<Basic Operation of Hydraulic Control Device 10>

Prior to the description of the operation of the feedback control, the basic operation of the hydraulic control device 10 will be described. In this basic operation, the operation of the hydraulic system which supplies the oil from the reservoir 18 to the continuously variable transmission mechanism 56 via the first pump 20 and the like will be described.

First, when the first pump 20 starts driving due to the drive of the engine 16, the first pump 20 pumps up the oil in the reservoir 18 and starts pumping the pumped-up oil as the first oil. As a result, the first oil flows through the oil passage 22 via the first port 96a and the second port 96b. The output pressure sensor 26 sequentially detects the pressure (output pressure) P1 of the first oil flowing through the oil passage 22, and outputs a signal indicating the detection result to the control unit 28. Further, the engine rotation speed sensor 116 sequentially detects the engine rotation speed New, and sequentially outputs a signal indicating the detection result to the control unit 28.

Figure 3:
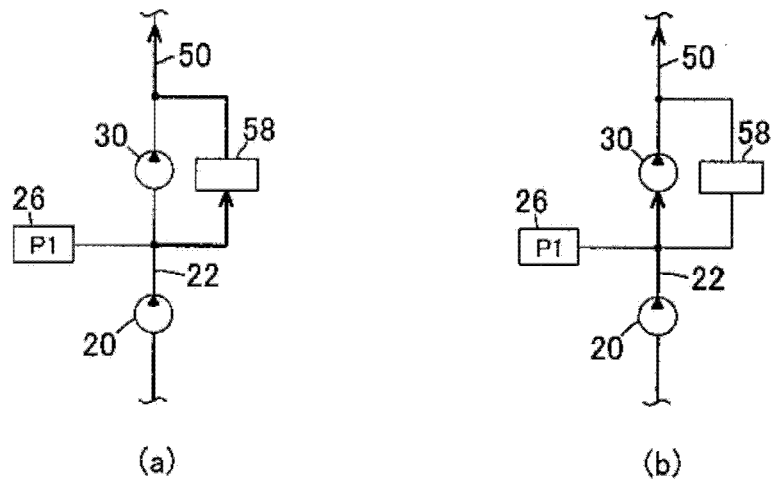
In FIG. 3, (a) is a diagram showing an oil flow in a first state, and (b) is a diagram showing an oil flow in a second state.

In this case, since the motor 32 is not driven, the first oil flowing through the oil passage 22 flows to the oil passage 50 via the bypass valve 58 along the line of the thick line, as schematically shown in (a) of FIG. 3. As a result, the first oil is supplied to the fourth port 96d via the oil passages 50 and 98, and is supplied to the fifth port 96e via the oil passages 50 and 100, and is also supplied to the CR valve 64 via the oil passages 50 and 50c. The CR valve 64 decompresses the supplied first oil, and supplies the decompressed first oil to the control valves 68a and 68b via the oil passage 66, respectively.

Here, control signals (current values IDN, IDR) are supplied in advance from the control unit 28 to the solenoids of the control valves 68a and 68b, and the control valves 68a and 68b are in the valve closed state. Therefore, when the supply of the control signal to each solenoid is stopped, the control valves 68a and 68b are switched from the valve closed state to the valve open state. As a result, the control valve 68a supplies the oil to the regulator valve 52a via the oil passage 74a and also supplies the oil to the seventh port 96g via the oil passage 76a. Further, the control valve 68b supplies the oil to the regulator valve 52b via the oil passage 74b and also supplies the oil to the sixth port 96f via the oil passage 76b.

The regulator valve 52a uses the pressure of the oil supplied via the oil passage 74a as the pilot pressure, and when the pressure of the first oil is greater than or equal to a predetermined pressure, the regulator valve 52a is in a communication state, and the first oil is supplied to the driven pulley 56a via the oil passage 54a. The side pressure sensor 62 sequentially detects the pressure (pulley pressure PDN, which is also the side pressure) of the first oil supplied to the driven pulley 56a, and sequentially outputs a signal indicating the detection result to the control unit 28.

In addition, the regulator valve 52b uses the pressure of the oil supplied via the oil passage 74b as the pilot pressure, and when the pressure (line pressure PH) of the first oil is greater than or equal to a predetermined pressure, the regulator valve 52b is in a communication state, and the first oil is supplied to the drive pulley 56b via the oil passage 54b.

Further, in the line pressure adjusting valve 24, the first oil is supplied to the fourth port 96d, and the oil is supplied from the control valve 68b to the sixth port 96f, while the oil is also supplied from the control valve 68a to the seventh port 96g. In this case, since the pressure (line pressure PH, output pressure P1) of the first oil is greater than the pressure of the oil from each of the control valves 68a and 68b, the first spool 92a moves to the right side in FIG. 2 due to the line pressure PH against the elastic force of the first elastic member 94a and the pressure of the oil. As a result, the recess 102c and the first port 96a communicate with each other, and the first oil can be supplied to a low-pressure system such as the lubrication system 108 as the third oil via the first port 96a, the recesses 102c and 102d, the third port 96c, and the oil passage 90.

In this way, when a control signal is supplied from the control unit 28 to the driver 34 in the state where the first pump 20 is being driven, the driver 34 drives the motor 32 based on the control signal and drives the second pump 30. As a result, the second pump 30 outputs the first oil flowing through the oil passage 22 as the second oil.

Then, when the second oil flows through the oil passage 50 and the flow rate of the second oil (discharge flow rate of the second pump 30) exceeds the flow rate of the first oil (discharge flow rate of the first pump 20), in the bypass valve 58, the pressure (line pressure PH) of the oil on the oil passage 50 side becomes greater than the pressure (output pressure P1) of the oil on the oil passage 22 side. As a result, the bypass valve 58 is in the valve closed state, and the supply of the first oil from the first pump 20 to the continuously variable transmission mechanism 56 and the like via the bypass valve 58 and the oil passage 50 as shown in (a) of FIG. 3 is switched to the supply of the second oil from the second pump 30 to the continuously variable transmission mechanism 56 and the like via the oil passage 50 as shown by the thick line in (b) of FIG. 3. As a result, the flow of the first oil to the oil passage 50 is blocked, and the second oil is pumped by the second pump 30 to the continuously variable transmission mechanism 56 and the like. The second oil is supplied to the fourth port 96d via the oil passages 50 and 98, is supplied to the fifth port 96e via the oil passages 50 and 100, and is supplied to the CR valve 64. Further, the driver 34 sequentially outputs a signal indicating the motor rotation speed Nem of the motor 32 (rotation speed Nep of the second pump 30) to the control unit 28.

The CR valve 64 decompresses the supplied second oil, and supplies the decompressed second oil to the control valves 68a and 68b via the oil passage 66, respectively. Since the control valve 68a is in the valve open state, it supplies the oil to the regulator valve 52a via the oil passage 74a and also supplies the oil to the seventh port 96g via the oil passage 76a. Further, since the control valve 68b is also in the valve open state, it supplies the oil to the regulator valve 52b via the oil passage 74b and also supplies the oil to the sixth port 96f via the oil passage 76b.

As a result, the regulator valve 52a supplies the second oil to the driven pulley 56a with the pressure of the oil supplied via the oil passage 74a as the pilot pressure. The side pressure sensor 62 sequentially detects the pressure (side pressure PDN) of the second oil supplied to the driven pulley 56a and outputs it to the control unit 28. In addition, the regulator valve 52b supplies the second oil to the drive pulley 56b with the pressure of the oil supplied via the oil passage 74b as the pilot pressure.

In this way, since the pressurized second oil is supplied to the driven pulley 56a and the drive pulley 56b, the pressure (output pressure) P1 of the first oil can be reduced, and the load on the first pump 20 can be reduced. In this case, the first spool 92a moves to the right side in FIG. 2 with the pressure (line pressure PH) of the second oil supplied to the fourth port 96d of the line pressure adjusting valve 24 as the pilot pressure, and the output pressure P1 can be reduced by increasing the opening degree (opening area) between the first port 96a and the recess 102c.

Further, in the line pressure adjusting valve 24, the oil is supplied to the sixth port 96f and the seventh port 96g, respectively. In this case, since the line pressure PH is greater than the pressure of the oil, the first spool 92a further moves to the right side in FIG. 2 against the elastic force of the first elastic member 94a and the pressure of the oil. As a result, when the recess 102b and the fifth port 96e communicate with each other, the oil passage 22 and the oil passage 100 communicate with each other. As a result, an increase in the pressure (line pressure PH) of the second oil supplied to the oil passage 100 is suppressed, and the line pressure PH can be maintained at a predetermined pressure.

Here, a state in which the second pump 30 is operated and the second oil is supplied from the second pump 30 will be described in detail. In addition, in the following description, the state in which the second pump 30 is operated and the second oil is supplied from the second pump 30 is referred to as a "servo state."

Here, first, in describing the change of each value in the servo state, the calculation of the target rotation speed NA of the second pump 30 in the servo state will be described. In the calculation of the target rotation speed NA of the second pump 30, first, the control unit 28 calculates the estimated value of the line pressure PH, and calculates an estimated value of the pressure P3 of the third oil (hereinafter referred to as "low hydraulic pressure").

<Estimation of Line Pressure PH>

Figure 4:
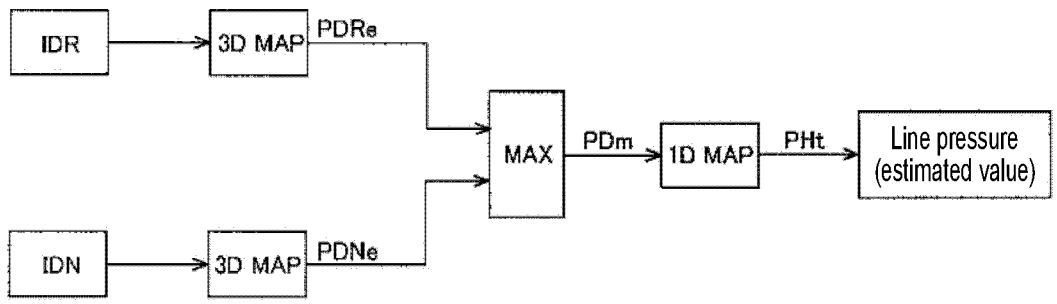
FIG. 4 is a block diagram showing a calculating procedure of an estimated value of the line pressure.

FIG. 4 is a block diagram showing a calculating procedure of an estimated value of the line pressure PH. The control unit 28 uses the current value IDN, which is a control signal supplied to the solenoid of the control valve 68a, and the current value IDR, which is a control signal supplied to the solenoid of the control valve 68b, and refers to various maps stored in advance to calculate an estimated value of the line pressure PH.

The control unit 28 estimates the line pressure PH (estimated line pressure PH) according to a command value with the side pressure (pulley pressure) PDN or the like as the command value.

The side pressure PDN of the driven pulley 56a is the pressure of the oil supplied from the oil passage 50 to the driven pulley 56a via the oil passage 50a, the regulator valve 52a and the oil passage 54a. The side pressure PDN can be adjusted according to the pressure (pilot pressure) of the oil supplied from the control valve 68a to the regulator valve 52a via the oil passage 74a. Further, the side pressure PDR of the drive pulley 56b is the pressure of the oil supplied from the oil passage 50 to the drive pulley 56b via the oil passage 50b, the regulator valve 52b and the oil passage 54b. The side pressure PDR can be adjusted according to the pressure (pilot pressure) of the oil supplied from the control valve 68b to the regulator valve 52b via the oil passage 74b.

Therefore, the control unit 28 refers to a 3D map stored in advance, and obtains an estimated value of the side pressure PDN (estimated side pressure PDNe serving as a command value) according to the control signal (current value IDN) supplied to the solenoid of the control valve 68a. Further, the control unit 28 refers to a 3D map stored in advance, and obtains an estimated value of the side pressure PDR (estimated side pressure PDRe serving as a command value) according to the control signal (current value IDR) supplied to the solenoid of the control valve 68b.

Each 3D map is a three-dimensional map showing the relationship between the current values IDN and IDR and the estimated side pressures PDNe and PDRe generated for each oil temperature To of the first oil or the second oil. Therefore, the control unit 28 specifies the estimated side pressures PDNe and PDRe according to the current oil temperature To and the current values IDN and IDR from the 3D maps.

Next, the control unit 28 determines the higher hydraulic pressure value of the two specified estimated side pressures PDNe and PDRe as a target side pressure PDm. Next, the control unit 28 refers to a 1D map stored in advance, and specifies a target value PHt of the line pressure PH according to the target side pressure PDm. The 1D map is a one-dimensional map showing the relationship between the target side pressure PDm and the line pressure PH.

Finally, the control unit 28 determines a value obtained by adding a predetermined amount of margin to the target value PHt as an estimated value of the line pressure PH (estimated line pressure PH).

<Estimation of Low Hydraulic Pressure P3>

The control unit 28 refers to multiple maps corresponding to each component of the hydraulic system of the transmission 12 stored in advance to estimate the pressure (low hydraulic pressure) P3 of the third oil supplied to the TC regulator valve 104, the oil warmer 106, and the lubrication system 108 via the oil passage 90.

The characteristics of each component configuring the hydraulic system of the transmission 12 are stored in advance as a map. Therefore, the control unit 28 estimates the low hydraulic pressure P3 (estimated value P3e) by using the map of the characteristics of each component stored in advance.

Specifically, the control unit 28 estimates the pressure PCR of the oil passing through the CR valve 64 by using the estimated value of the line pressure PH and the current value ICPC of the control signal supplied to the CPC valve 70. In this case, the control unit 28 obtains the pressure PCR for each temperature and sets the obtained characteristics of the pressure PCR as a map.

Next, the control unit 28 estimates the pressure PLCC of the oil passing through the TC regulator valve 104 by using the map of the pressure PCR and the current value ILCC of the control signal supplied to the solenoid of the LCC valve 72. The pressure PLCC is also the pressure of the oil supplied to the lockup clutch 112. In this case, the control unit 28 obtains the pressure PLCC for each temperature and sets the obtained characteristics of the pressure PLCC as a map.

Next, the control unit 28 obtains the leakage amount of the hydraulic path leading to the driven pulley 56a and the drive pulley 56b via the oil passages 50, 50a and 50b from the maps of the current values IDN and IDR and the side pressures PDN and PDR. Further, the control unit 28 obtains the leakage amount of the LCC valve 72 from the map of the current value ILCC, and obtains the leakage amount of the CR valve 64 and the leakage amount of the CPC valve 70 from the map of the current value ICPC.

Further, the control unit 28 calculates the flow rate (shift flow rate of the driven pulley 56a and the drive pulley 56b) of the second oil to be supplied to the continuously variable transmission mechanism 56 during the shift operation from the area of the pulley chamber of the driven pulley 56a and the drive pulley 56b and the rotation speed of the driven pulley 56a and the drive pulley 56b.

Then, the control unit 28 calculates the flow rate QPH of the oil to be supplied to the high-pressure hydraulic system from the second pump 30 to the driven pulley 56a and the drive pulley 56b by adding the leakage amount of in the hydraulic path leading to the driven pulley 56a and drive pulley 56b, the leakage amount of LCC valve 72, the leakage amount of CPC valve 70, the leakage amount of CR valve 64, the shift flow rate, and the leakage amount of driven pulley 56a and drive pulley 56b.

Next, the control unit 28 calculates the flow rate Q3 of the third oil supplied to the low-pressure system via the oil passage 90 by subtracting the flow rate QPH from the discharge flow rate of the first oil from the first pump 20.

Next, the control unit 28 calculates an estimated value of the low hydraulic pressure P3 according to the oil temperature To of the first oil or the second oil based on the pressure PLCC of the oil passing through the TC regulator valve 104 and the flow rate Q3 of the third oil.

Figure 5:
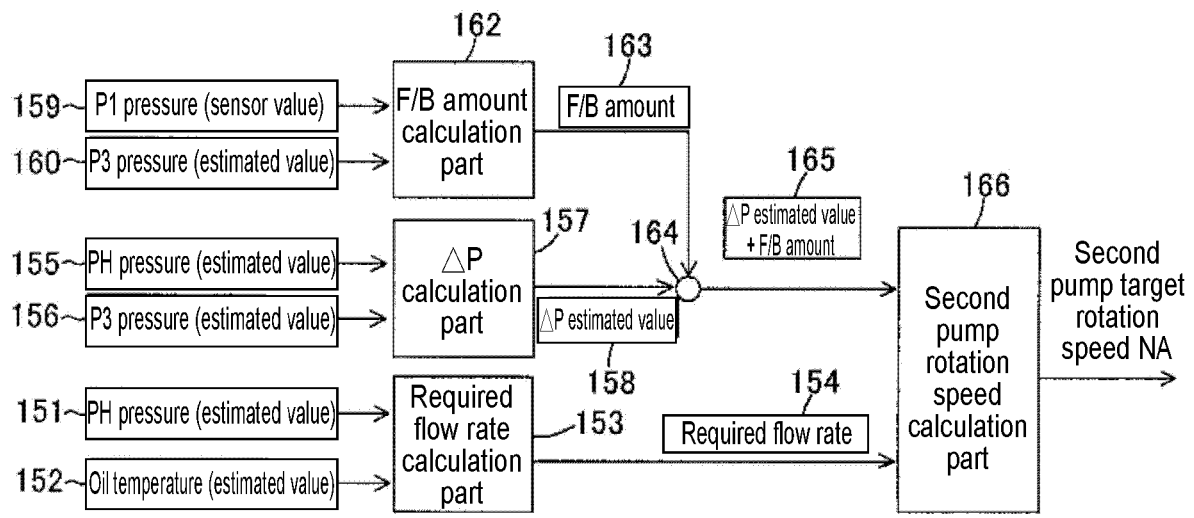
FIG. 5 is a block diagram showing a calculating procedure of a target rotation speed of the second pump.

FIG. 5 is a block diagram showing a calculating procedure of the target rotation speed NA of the second pump 30. In the calculation of the target rotation speed of the second pump 30, as shown in FIG. 5, a required flow rate calculation part 153 calculates an oil flow rate (required flow rate) 154 required for the continuously variable transmission mechanism 56, which is a hydraulic operation part, by using an estimated value 151 of the line pressure PH and an oil temperature 152 detected by the oil temperature sensor 118. Further, a differential pressure calculation part 157 obtains an estimated value 158 of the differential pressure ΔP (=line pressure PH–low hydraulic pressure P3) by using an estimated value 155 of the line pressure PH and an estimated value 156 of the low hydraulic pressure P3. Further, an F/B amount calculation part 162 calculates a feedback amount 163 by using a detected value 159 of the output pressure P1 detected by the output pressure sensor 26 and an estimated value 160 of the low hydraulic pressure P3. Then, an addition part 164 calculates an addition value 165 by adding the feedback amount 163 to the calculated value 158 of the differential pressure ΔP, and a rotation speed calculation part 166 calculates the target rotation speed NA of the second pump 30 by using this addition value 165 and the required flow rate 154.

Figure 6:
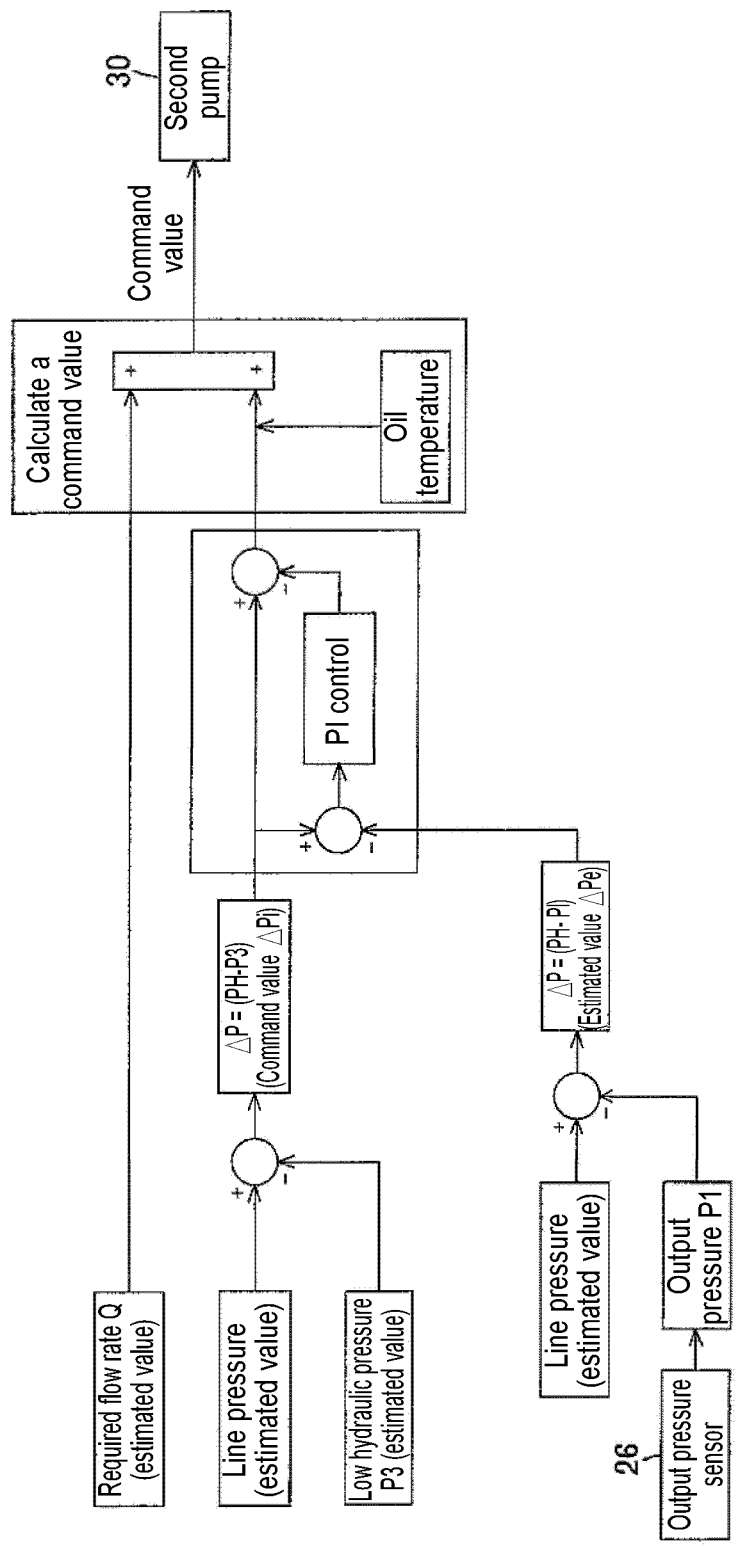
FIG. 6 is a block diagram showing a calculating procedure of a target rotation speed of the second pump in feedback control.

The calculation of the feedback amount by the F/B amount calculation part 162 will be described in detail. FIG. 6 is an illustrating diagram showing processing in the control unit 28 which performs the feedback control with respect to the differential pressure ΔP by using the output pressure P1 detected by the output pressure sensor 26. That is, FIG. 6 is a control method for feedback-controlling the output pressure P1 with the estimated value of the low hydraulic pressure P3 as the target value by feeding back to the control unit 28 the change amount of the output pressure P1 as the rotation speed of the second pump 30 increases.

When the estimated value of the line pressure PH is estimated and the estimated value of the low hydraulic pressure P3 is estimated, the control unit 28 generates a command value ΔPi (=PHe–P3e) of the differential pressure ΔP by subtracting the estimated value of the low hydraulic pressure P3 from the estimated value of the line pressure PH. Further, the control unit 28 calculates an estimated value ΔPe (=PHe–P1) of the differential pressure ΔP by subtracting the output pressure P1 detected by the output pressure sensor 26 from the estimated value of the line pressure PH.

Next, the control unit 28 obtains a deviation Ae (=ΔPi–ΔPe) by subtracting the estimated value ΔPe from the command value ΔPi. The obtained deviation Ae is passed through a proportional integration element (PI control) and added to the command value ΔPi. That is, the control unit 28 performs the feedback control with the deviation Ae as the feedback amount for the command value ΔPi.

In this case, Δe=ΔPi–ΔPe=(PHe–P3e)–(PHe–P1)=P1–P3e. Therefore, the control unit 28 performs feedback control for the command value ΔPi so that the output pressure P1 becomes an estimated value of the low hydraulic pressure P3. Next, the control unit 28 adjusts the command value ΔPi after the feedback control in consideration of the oil temperature To of the first oil or the second oil as well. After that, the required flow rate Q and the adjusted command value ΔPi are used to calculate the command value of the rotation speed for the second pump 30.

Figure 7:
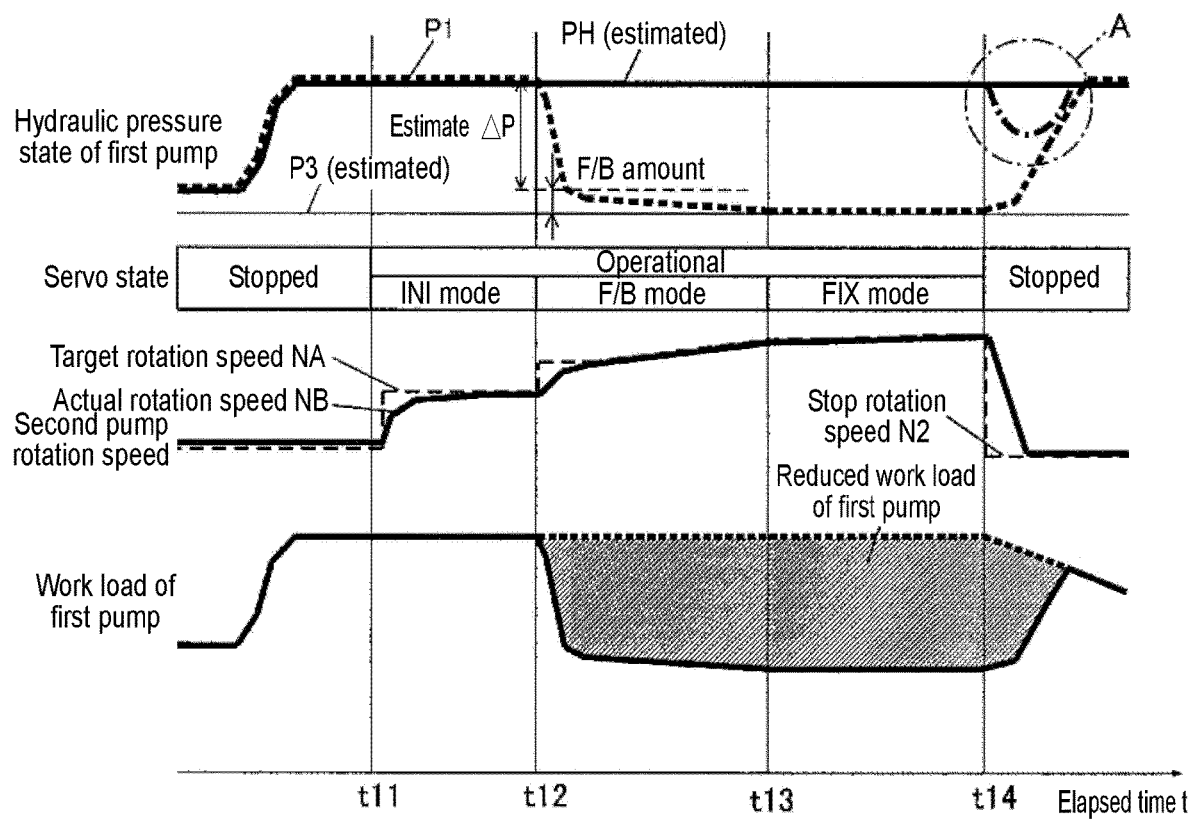
FIG. 7 is a timing chart for illustrating changes in each value in a servo state.

FIG. 7 is a timing chart for illustrating changes in each value in the servo state. This timing chart shows the changes of the output pressure P1, the line pressure PH (estimated value), the low hydraulic pressure P3 (estimated value), the operation state (operational/stopped and operation mode) of the second pump 30, the target rotation speed NA and the actual rotation speed NB of the second pump 30 with respect to the elapsed time t.

In the timing chart of FIG. 7, the second pump 30 is stopped before the time point t11. In this state, the first oil is supplied from the first pump 20 to the continuously variable transmission mechanism 56 via the bypass valve 58 and the oil passage 50 (see (a) of FIG. 3). Therefore, the output pressure P1 which is the pressure of the first oil flowing through the oil passage 50 is equal to the line pressure PH (output pressure P1=line pressure PH). Further, the low hydraulic pressure P3 is less than the line pressure PH and the output pressure P1 (line pressure PH>low hydraulic pressure P3, output pressure P1>low hydraulic pressure P3).

Then, when the second pump 30 operates at the time point t11, it is then switched to the supply of the second oil from the second pump 30 to the continuously variable transmission mechanism 56 via the oil passage 50 (see (b) of FIG. 3). Therefore, after the state shown in (b) of FIG. 3 is reached, the pressure of the second oil becomes the line pressure PH.

Here, the control unit 28 of the hydraulic control device 10 controls the motor 32 via the driver 34 so that the actual rotation speed NB of the second pump 30 (torque of the second pump 30) increases with respect to the elapsed time t. Accordingly, the flow rate of the second oil discharged from the second pump 30 gradually increases as the actual rotation speed NB of the second pump 30 increases. As a result, after the time point t11, the output pressure P1 can be gradually reduced with the elapsed time t.

Then, in the operation state (servo state) of the second pump 30, the second pump 30 is operated by sequentially passing through each mode of the initial mode (INI mode), the feedback mode (F/B mode) and the fixed mode (FIX mode). In the initial mode, the target rotation speed NA of the second pump 30 increases at the time point t11, and the actual rotation speed NB gradually increases following the target rotation speed NA. Further, in this initial mode, the target rotation speed NA of the second pump 30 is a rotation speed that can discharge only the flow rate required for consumption in the hydraulic operation part (target rotation speed corresponding to only the required flow rate 154 in FIG. 5). Therefore, the output pressure P1 does not decrease during the initial mode. When it is determined that the actual rotation speed NB of the second pump 30 matches the target rotation speed NA, the initial mode ends.

In the feedback mode following the initial mode, the output pressure P1 gradually decreases toward the low hydraulic pressure P3 as the actual rotation speed NB of the second pump 30 gradually increases. At the same time, the feedback control of the rotation speed of the second pump 30 is performed. That is, the control unit 28 performs the feedback control of the rotation speed of the second pump 30 by using the output pressure P1 detected by the output pressure sensor 26, the estimated value of the line pressure PH, and the estimated value of the low hydraulic pressure P3. In this feedback mode, the output pressure P1 is feedback-controlled with the low hydraulic pressure P3 as the target value by feeding back the change amount of the output pressure P1 due to the increase in the actual rotation speed NB of the second pump 30 to the control unit 28.

As a result, for example, due to the error between the control value of each pressure and the actual pressure value and the variation in the discharge performance of the second pump 30, even if the output pressure P1 cannot be reduced to the low hydraulic pressure P3 by using the target rotation speed of open control (the target rotation speed corresponding to the calculated value 158 of the differential pressure $\Delta P$ (=line pressure PH–low hydraulic pressure P3) shown in FIG. 5), in the feedback mode after the time point t12, the output pressure P1 can be reduced to the low hydraulic pressure P3 by using the target rotation speed to which the feedback amount (F/B amount 163 in FIG. 5) is added.

When the feedback mode ends at the time point t13, the output pressure P1 drops till the low hydraulic pressure P3 at this time point (P1~P3), and then the output pressure P1 is maintained at the low hydraulic pressure P3 (fixed mode). That is, in the fixed mode, the state of P1 P3 is maintained by keeping the rotation speed of the second pump 30 substantially constant. Then, when the operation of the second pump 30 at a time point t14 stops, the target rotation speed NA of the second pump 30 is changed to a stop rotation speed (≈0), and an actual rotation speed [check] NB also decreases accordingly and gradually reaches the stop rotation speed. Accordingly, after the time point t14, the output pressure P1 gradually increases toward the line pressure PH. Through the operation of the second pump 30 as the above, in the state where the output pressure P1 decreases, the work load of the first pump 20 is reduced, and the fuel consumption of the vehicle 14 is improved.

Here, the operation condition of the second pump 30 is described. In the hydraulic control device of the embodiment, whether the operation of the second pump 30 is allowed/disallowed is determined based on a vehicle traveling state determination and a determination on the performance limit of the second pump 30.

In the vehicle traveling state determination, specifically, in the case where, as the vehicle traveling state, for example, a shift command mode of the transmission (continuously variable transmission) being changed to a kick-down mode, a manual mode, a paddle mode, a change amount of the opening degree of the accelerator being equal to or greater than a threshold, a change amount of a ratio (actual ratio) of the transmission being equal to or greater than a threshold, an indicative pressure of the drive pulley 56b or the driven pulley 56a being equal to or greater than a threshold, a road surface on which the vehicle is traveling being a low friction coefficient road (low μ road), the vehicle spinning on ice, step shift being performed in the shift change of the transmission, the operation of the second pump 30 is disallowed due to the concern that the hydraulic pressure or the flow rate of the second pump 30 may become a high hydraulic pressure or a high flow rate.

Figure 8:
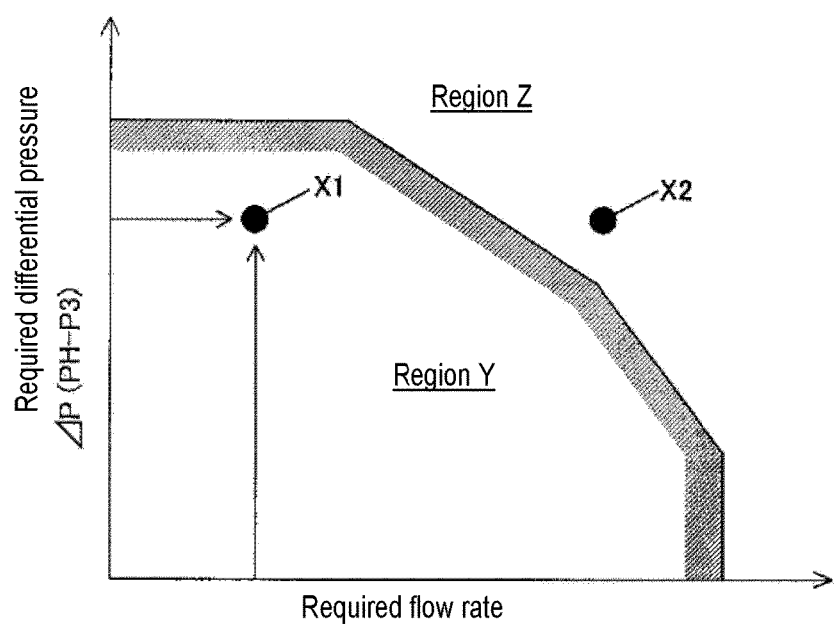
FIG. 8 is a graph showing regions where an operation of the second pump is allowed/disallowed in a determination on a performance limit of the second pump.

In addition, in the determination on the performance limit of the second pump 30, a determination is performed on whether the operation state of the second pump 30 is within an operable range where a state in which the output pressure P1 and the low hydraulic pressure P3 are equal (output pressure P1=low hydraulic pressure P3) can be realized. FIG. 8 is a graph (map) showing regions where the operation of the second pump 30 is allowed/disallowed in the determination on the performance limit of the second pump 30. In the graph of the same figure, the horizontal axis represents the flow rate (required flow rate) of the second pump 30, and the vertical axis represents the required hydraulic pressure ($\Delta P$=line pressure PH–low hydraulic pressure P3) of the second pump 30. The graph (map) shows an example at a certain oil temperature. However, in reality, a plurality of different graphs (maps) are prepared for each oil temperature. A region Y shown in FIG. 8 is a range where the operation of the second pump 30 is allowed (operation-allowed region), and a region Z other than this region is a range where the operation of the second pump 30 is disallowed (operation-disallowed region). If the state determined from the relationship between the required flow rate and the required hydraulic pressure is, for example, a state of a point X1 of FIG. 8, the operation of the second pump 30 is allowed, and if the determined state is a state of a point X2, the operation of the second pump 30 is disallowed.

Accordingly, in the case where the second pump 30 is in the operation-disallowed region based on the vehicle traveling state determination and the determination on the performance limit of the second pump 30, the operation thereof is determined as disallowed. Therefore, in the case where the operation of the second pump 30 is determined as disallowed based on the vehicle traveling state determination or the determination on the performance limit of the second pump 30 in a state where the second pump 30 is operating, control is performed to stop the operation of the second pump 30. Besides, in the case where the second pump 30 is determined as failed in the state where the second pump 30 is operating, control is performed to stop the second pump 30. Besides, further to the above cases, in a normal vehicle traveling state, such as the case where the shift position of the transmission is switched from a position for traveling forward to a position for traveling backward or the case where the accelerator opening degree is changed to 0, for example, control is also performed to stop the second pump 30. Therefore, the aspects for performing control to stop the second pump 30 include three aspects, i.e., (1) stopping due to a failure of the second pump 30; (2) stopping in an operation-allowed region; and (3) stopping in the case where the second pump 30 is in the operation-disallowed region. In the following, the stop controls of the second pump 30 in the respective three aspects are described in detail.

Figure 9:
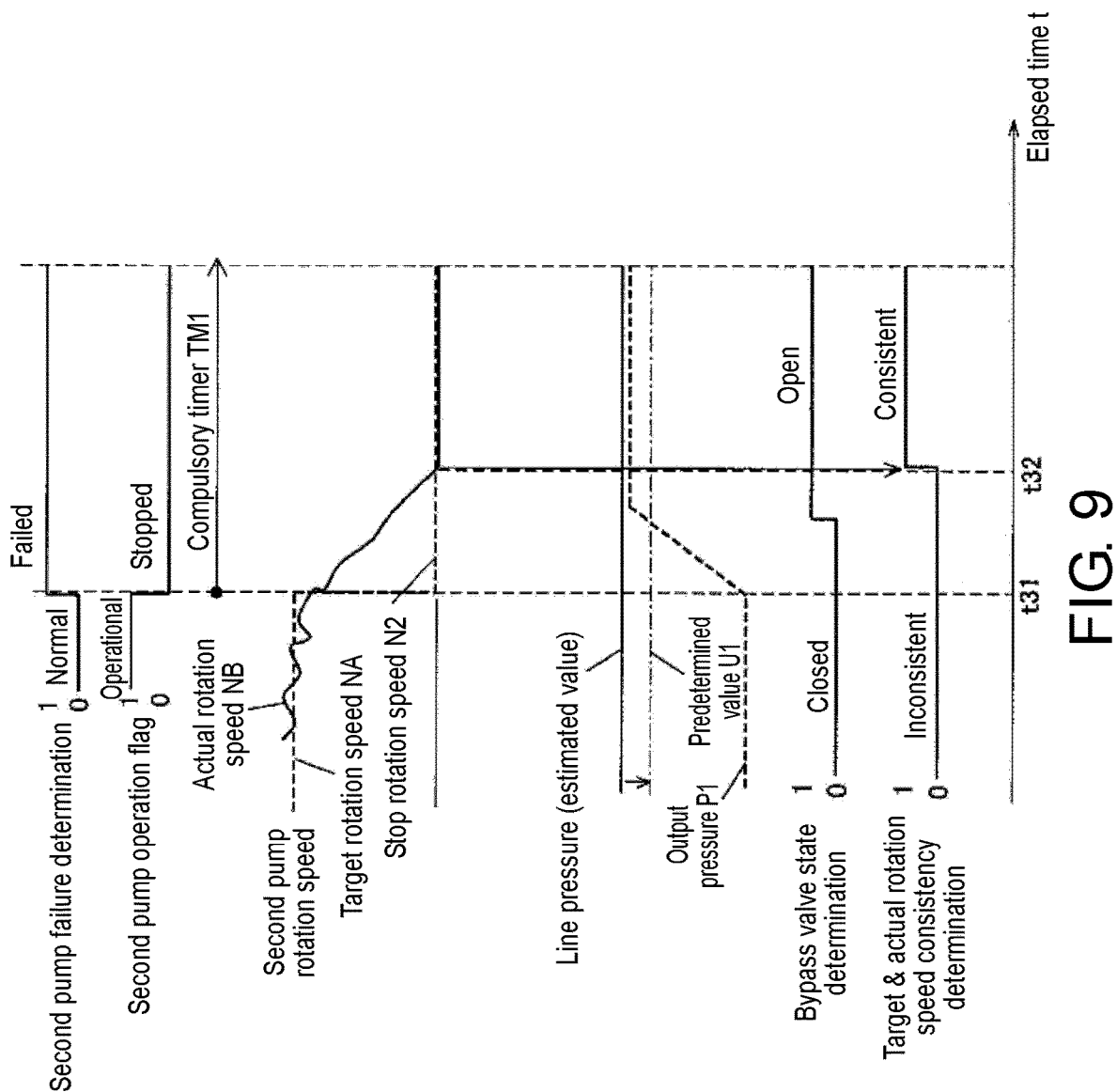
FIG. 9 is a timing chart showing changes in each value in the control that stops the second pump when the second pump is determined as failed.
Figure 10:
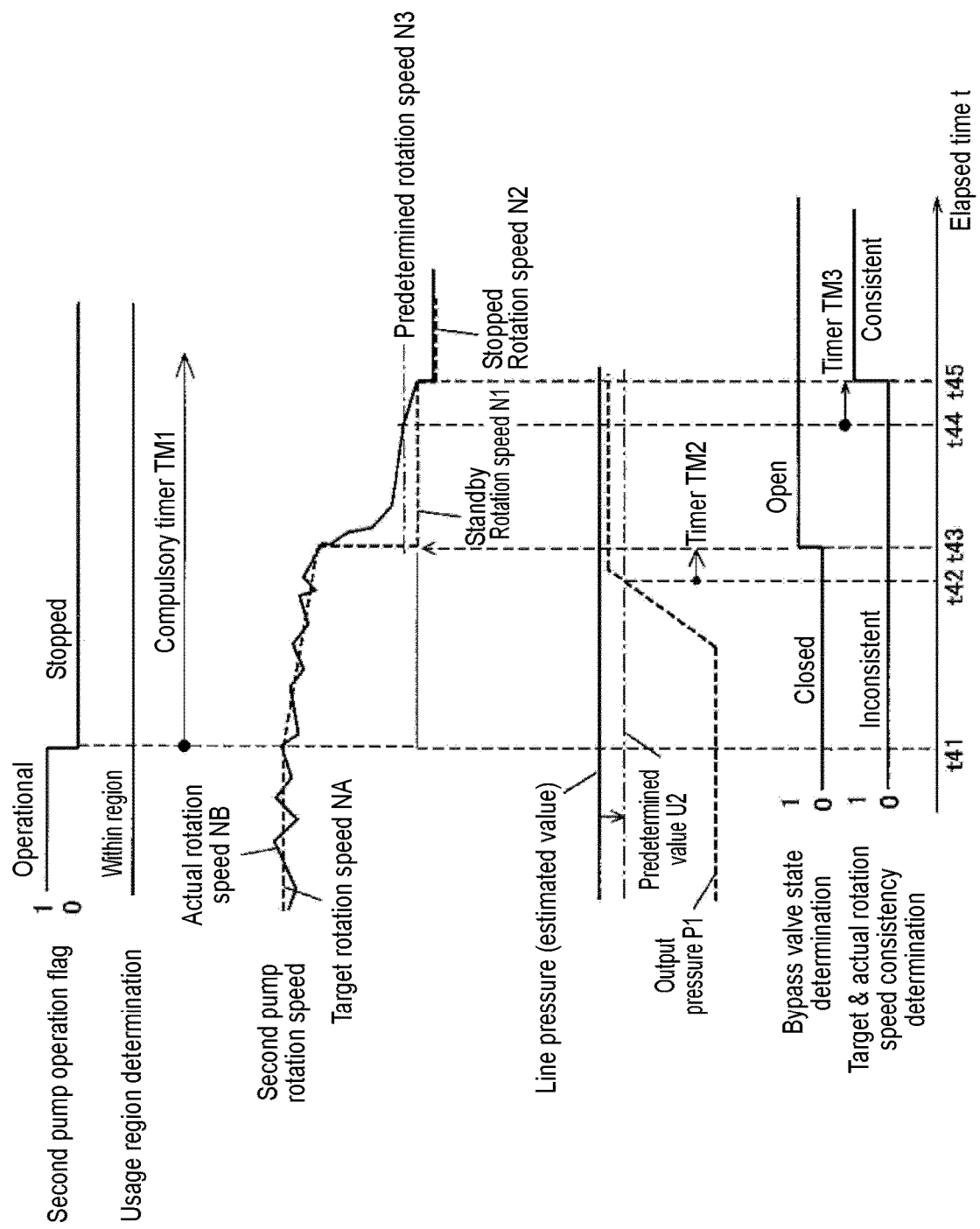
FIG. 10 is a timing chart showing changes in each value in the control that stops the second pump in an operation-allowed region.
Figure 11:
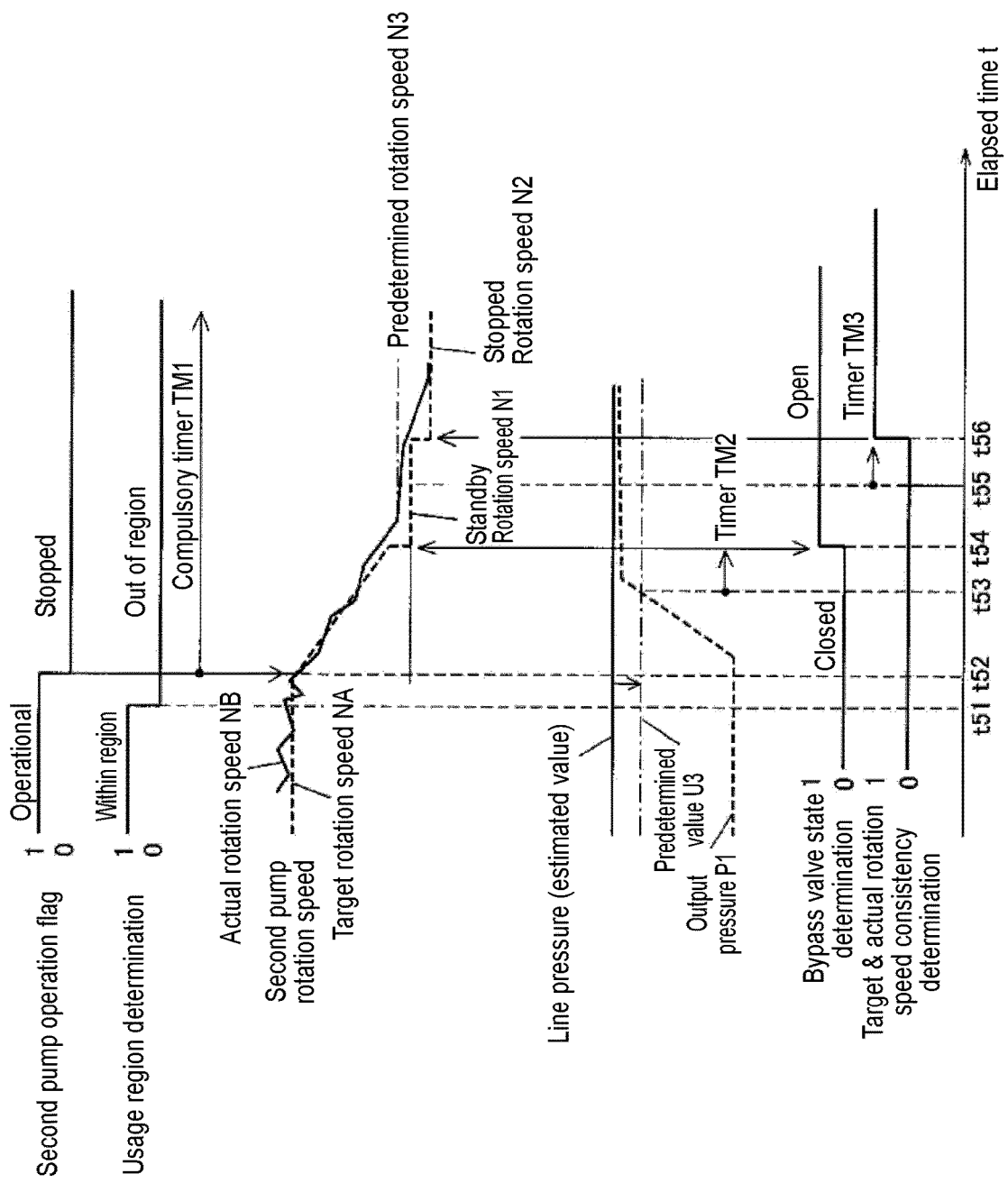
FIG. 11 is a timing chart showing changes in each value in the control that stops the second pump when the second pump is in an operation-disallowed region.

FIG. 9 is a timing chart showing changes in each value in the control that stops the second pump 30 when the second pump 30 is determined as failed. The timing chart of the same figure shows the respective changes of a failure determination flag of the second pump 30, an operation flag of the second pump 30, flags for the target rotation speed NA and the actual rotation speed NB, the line pressure PH (estimated value), and the output pressure P1, a flag for determination on the state (open/closed) of the bypass valve 58, a flag for determination on whether the target rotation speed and the actual rotation speed of the second flag 30 are consistent with respect to a lapsed time t. FIGS. 10 and 11 are the same in terms of the types of the values on the timing charts.

In the control that stops the second pump 30 in the case where the second pump 30 is determined as failed, as shown in FIG. 9, by determining the second pump 30 as failed and changing the failure determination flag from 0 (normal) to 1 (failed) at a time point t31, the operation flag of the second pump 30 is changed from 1 (operational) to 0 (stopped). Accordingly, the target rotation speed NA of the second pump 30 is changed to a stop rotation speed N2 (≈0). Here, it is necessary to promptly stop the second pump 30 as the stop is due to a failure. Therefore, the target rotation speed NA of the second pump 30 is directly changed to the stop operation speed N2 at the time point t31. Accordingly, since the time point t31, the actual rotation speed NB of the second pump 30 decreases gradually. Meanwhile, the output pressure P1 gradually increases. At a time point t32, by determining that the output pressure P1 has increased till a value substantially consistent with the line pressure PH, the state of the bypass valve 58 is determined as being changed from a closed state to an open state. The determination that the output pressure P1 has increased till the value substantially consistent with the line pressure PH is a determination made based on that the output pressure P1 exceeds a hydraulic pressure predetermined value U1 less than the estimated value of the line pressure PH by a predetermined amount. Then, with the actual rotation speed NB of the second pump 30 being changed to the stop rotation speed N2 at the time point t32, the target rotation speed NA is determined as consistent with the actual rotation speed NB. In the control that stops the second pump 30 in the case where the second pump 30 is determined as failed, a compulsory timer TM1 for stopping the second pump 30 at the time point 31 is operated. The compulsory timer TM1 is one provided for the sake of safety, and is one that compulsorily stops the second pump 30 in the case where the actual rotation speed of the second pump 30 has not decreased to the stop rotation speed N2 (the case where the target rotation speed NA has not been determined as consistent with the actual rotation speed NB) at a time point at which the compulsory timer TM1 completes the countdown.

FIG. 10 is a timing chart showing changes in each value in the control that stops the second pump 30 in the operation-allowed region. In the control that stops the second pump 30 in the operation-allowed region, as shown in the same figure, the stop of the second pump 30 is determined at a time point t41, and the operation flag of the second pump is changed from 1 (operational) to 0 (stopped). Accordingly, since the time point t41, the target rotation speed NA of the second pump 30 decreases gradually. Here, the rate (slope) at which the target rotation speed NA decreases is a rate (slope) smaller than stopping in the case where the second pump 30 is in the operation-disallowed region, which will be described afterwards. Then, as the target rotation speed NA decreases, the actual rotation speed NB also decreases. In addition, at the time point t41, the compulsory timer TM1 also operates. Then, at a time point t42, when the output pressure P1 is determined as having increased to a value substantially consistent with the line pressure PH by exceeding a hydraulic pressure predetermined value U2 less than the estimated value of the line pressure PH by a predetermined amount, the countdown of a timer TM2 starts. At a time point t43, with the timer TM2 completing the countdown, the state of the bypass valve 58 is determined as being changed from the closed state to the open state. Meanwhile, the target rotation speed NA of the second pump 30 decreases to the standby rotation speed N1. Here, the standby rotation speed N1 is a value somewhat greater than the stop rotation speed N2, and is the lowest rotation speed at which the second pump 30 substantially does not stop. Here, the reason for setting the standby rotation speed N1 is that, by going through the standby rotation speed N1, that the actual rotation speed NB follows the stop rotation speed can be confirmed before being shifted to the stop rotation speed N2, so the actual rotation speed NB can more stably decrease to the stop rotation speed N2.

Then, the actual rotation speed NB of the second pump 30 gradually decreases toward the target rotation speed NA, and at a time point t44, with the actual rotation speed NB of the second pump 30 decreasing till or lower than a predetermined rotation speed N3, which is a value greater than the target rotation speed NA by a predetermined amount, a timer TM3 operates. At a time point t45, the timer TM3 completes the countdown to decrease the target rotation speed NA till the stop rotation speed N2 (≈0). In addition, at this time point, the target rotation speed NA and the actual rotation speed NB are determined as consistent. The determination of being consistent is made under the conditions that a difference between the actual rotation speed NB of the second pump 30 and the standby rotation speed NB becomes equal to or less than the predetermined rotation speed N3 and the timer TM3 which starts to count down from the time point completes the countdown.

Accordingly, in the case where the second pump 30 is stopped in the operation-allowed region, control that gradually decreases the target rotation speed NA of the second pump 30 is performed. Then, the decreasing rate (slope) is a rate (slope) smaller than the case where the second pump 30 is in the operation-disallowed region, which will be described afterwards. This is because, compared with the case of drastically stopping the second pump 30, gradually decreasing the rotation speed of the second pump 30 and decreasing at a smaller rate can facilitate the fuel efficiency of the vehicle by suppressing the drastic decrease of the hydraulic pressure supplied to the hydraulic operation part, such as the continuously variable transmission mechanism 56, through the operation of the second pump 30. In addition, there is a case where a return (restart) command of the second pump 30 is received between the stop command of the second pump 30 and the actual stop. The above also allows the second pump 30 to return quickly in this case.

FIG. 11 is a timing chart showing changes in each value in the control that stops the second pump 30 when the second pump 30 is in the operation-disallowed region. In the control that stops the second pump 30 in the case where the second pump 30 is in the operation-disallowed region, as shown in the same figure, the second pump 30 is determined as in the operation-disallowed region at a time point t51, and an operation-disallowed region determination flag is changed from 1 (within region) to 0 (out of region). Together with this, at a time point t52, the stop of the second pump 30 is determined, the second pump operation flag is changed from 1 (operational) to 0 (stopped). Accordingly, since the time point t52, the target rotation speed NA of the second pump 30 decreases gradually. The decreasing rate here is a rate (slope) greater than the case where the second pump 30 is stopped in the operation-allowed region of FIG. 10. Then, as the target rotation speed NA decreases, the actual rotation speed NB also decreases. In addition, at the time point t52, the compulsory timer TM1 also operates. Then, with the output pressure P1 exceeding a hydraulic pressure predetermined value U3, which is a value less than the estimated value of the line pressure PH by a predetermined amount, at a time point t53, the timer TM2 operates. At a time point t54, the timer TM2 completes the countdown and, with the output pressure P1 having increased till a value substantially consistent with the line pressure PH, the state determination of the bypass valve 58 is changed from the closed state to the open state. Meanwhile, the target rotation speed NA of the second pump 30 decreases to the standby rotation speed N1. Here, the standby rotation speed N1 is a value somewhat greater than the stop rotation speed N2, and is the lowest rotation speed at which the second pump 30 substantially does not stop. Then, the actual rotation speed NB of the second pump 30 gradually decreases toward the target rotation speed NA, and with the actual rotation speed NB of the second pump 30 decreasing till or lower than the predetermined rotation speed N3, which is a value greater than the target rotation speed NA by a predetermined amount, at a time point t55, the timer TM3 operates, and the timer TM3 elapses to decrease the target rotation speed NA till the stop rotation speed N2 (≈0) at a time point t56. In addition, at this time point, the target rotation speed and the actual rotation speed are determined as consistent. The determination of being consistent, like the case of stopping in the operation-allowed region of FIG. 10, is made under the conditions that the difference between the actual rotation speed NB of the second pump 30 and the standby rotation speed NB becomes equal to or less than the predetermined rotation speed N3 and the timer TM3 which starts to count down from the time point completes the countdown. Then, the actual rotation speed NB of the second pump 30 decreases toward the target rotation speed NA (stop rotation speed N2), and the second pump 30 stops.

Here, the change rate (slope) of the target rotation speed NA during the gradual decrease of the target rotation speed NA of the second pump 30 from the time point t52 to the time point t53 in the control that stops the second pump 30 in the case where the second pump 30 is in the operation-disallowed region as shown in FIG. 11 is a change rate (slope) greater than the change rate (slope) of the target rotation speed NA during the gradual increase of the target rotation speed NA of the second pump 30 from the time point t41 to the time point t42 in the control that stops the second pump 30 in the operation-allowed region shown in FIG. 10. This is because, in the case where the second pump 30 is in the operation-disallowed region, it is necessary to ensure (secure) the required hydraulic pressure in the hydraulic operation part, such as the continuously variable transmission mechanism 56, by stopping the second pump 30 more quickly than in the operation-allowed region.

Moreover, in the case of the operation-allowed region shown in FIG. 10 and the case of being in the operation-disallowed region as shown in FIG. 11, gradually decreasing, instead of decreasing the target rotation speed NA till the stop rotation speed N2 (≈0) (at once) in the case where the second pump 30 fails as shown in FIG. 9, is carried out because when the target rotation speed NA of the second pump 30 is directly set to the stop rotation speed N2 (≈0) from the servo state, during the process of ending the servo state (process of transitioning from the first state to the second state), as shown by a dotted line represented by a symbol A of FIG. 7, the phenomenon that the line pressure PH (the hydraulic pressure of the oil supplied to the continuously variable transmission mechanism 56) decreases temporarily may occur. Consequently, the control for suppressing the amount of the decrease of the line pressure to a small amount as much as possible is carried out.

Accordingly, in the hydraulic control device, when the second pump 30 is stopped to switch from the second state to the first state, there is a concern that the phenomenon in which the line pressure PH (hydraulic pressure of the oil supplied to the continuously variable transmission mechanism 56) drops temporarily may occur, as shown by the dotted line represented by the symbol A of FIG. 7.

Therefore, in the embodiment, as the control for preventing the decrease (decrease in side pressure) of the hydraulic pressure (pulley side pressure) supplied to the continuously variable transmission mechanism 56 due to such temporary decrease of the line pressure PH, in addition to the control of gradually decreasing the rotation speed of the second pump 30 as the above, control that adds a correction hydraulic pressure of a predetermined amount to the hydraulic pressure supplied to the driven pulley 56a of the continuously variable transmission mechanism 56 is performed. In the following, such control is referred to as "side pressure correction control". In the following, the side pressure correction control is described.

Figure 12:
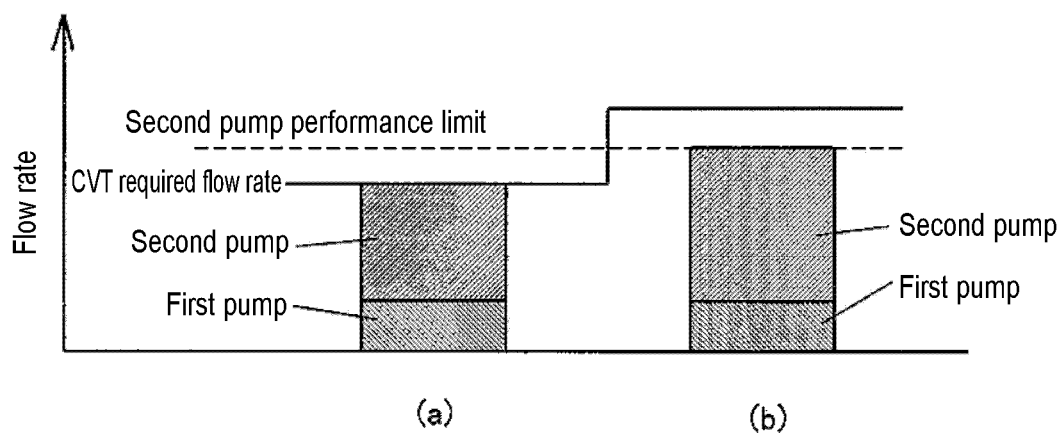
FIG. 12 is a diagram showing a relationship between a required oil flow rate in a continuously variable transmission mechanism and a performance limit of the second pump.

The side pressure correction control is implemented in the case where the operation of the second pump 30 is determined as disallowed based on the determination on the performance limit of the second pump 30 described above. That is, the relationship between the flow rate of the second pump 30 and the differential pressure is implemented in the case where the region falls out of the region U shown in FIG. 8. FIG. 12 is a diagram showing the relationship between the flow rate (required flow rate) of the oil required in the continuously variable transmission mechanism (CVT) 56 and the performance limit (of the discharge amount) of the second pump 30, where (a) of FIG. 12 shows the case where the required flow rate of the continuously variable transmission mechanism 56 is lower than the performance limit of the second pump 30, and (b) of FIG. 12 shows the case where the required flow rate of the continuously variable transmission mechanism 56 is higher than the performance limit of the second pump 30. In the region (region Y of FIG. 8) where the operation of the second pump 30 is allowed based on the determination on the performance limit, as shown in (a) of FIG. 12, the flow rate of the oil required in the continuously variable transmission mechanism 56 is lower than the performance limit of the second pump 30. Meanwhile, in the region (region other than the region Y of FIG. 8) where the operation of the second pump 30 is determined as disallowed, as shown in (b) of FIG. 12, the flow rate of the oil required in the continuously variable transmission mechanism 56 is higher than the performance limit of the second pump 30. Therefore, in the region other than the region Y, since the flow rate of the oil required in the continuously variable transmission mechanism 56 cannot be supplied through the operation of the second pump 30, it is necessary to make corresponding compensation for the flow rate/hydraulic pressure of the oil through the side pressure correction control.

Since the side pressure correction control is performed in the case where the operation of the second pump 30 is determined as disallowed based on the determination on the performance limit of the second pump 30, the control for the case where the second pump 30 is in the operation-disallowed region as shown in FIG. 11 is performed as the control that stops the second pump 30 in this case.

Figure 13:
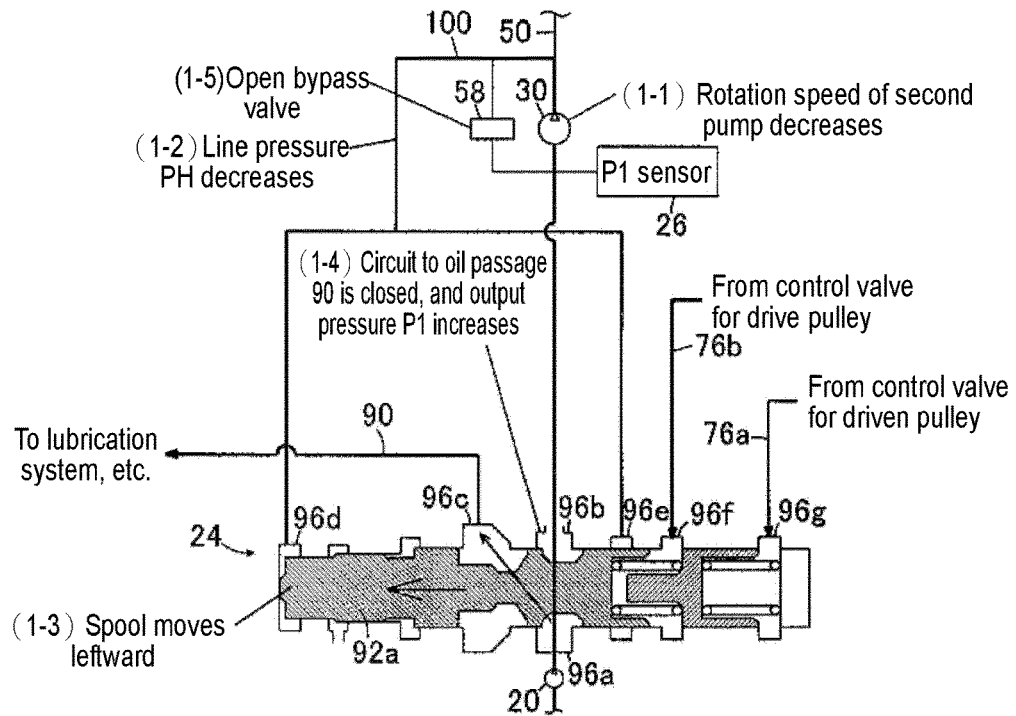
FIG. 13 is a hydraulic pressure circuit diagram for outlining side pressure correction control, where (a) is a case where the side pressure correction control is not performed, and (b) is a case where the side pressure correction control is performed.
Figure 13:
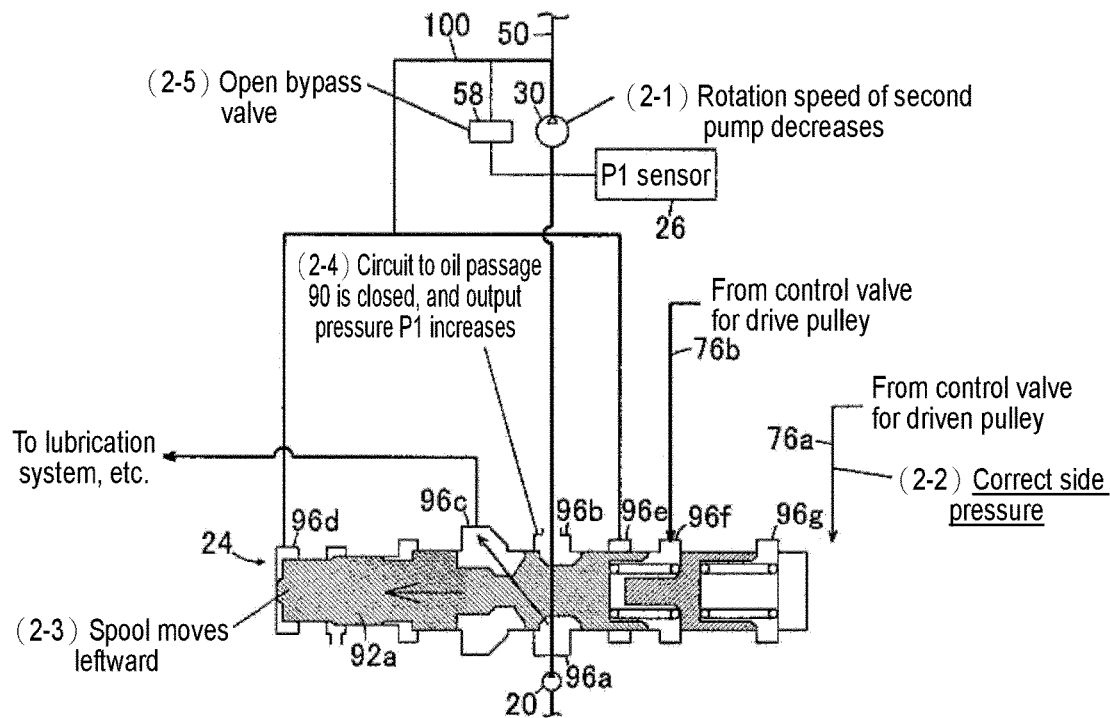

FIG. 13 is diagram showing a portion of a hydraulic pressure circuit diagram for outlining the side pressure correction control, where (a) is a case where the side pressure correction control is not performed, and (b) is a case where the side pressure correction control is performed. As shown in (a) of the same figure, the flow of the phenomenon that occurs when the second pump 30 is stopped is as follows. (1-1) The rotation speed of the second pump 30 decreases. (1-2) The line pressure PH decreases, and the flow rate of the oil flowing into the fourth port 96d and the fifth port 96e of the line pressure adjusting valve 24 decreases. (1-3) The first spool 92a of the line pressure adjusting valve 24 is moved toward the left of the figure. (1-4) The third port 96c of the line pressure adjusting valve 24 is closed, and the output pressure P1 of the first pump 20 increases. (1-5) The bypass valve 58 is opened, and the second state is switched to the first state. As described above, between (1-1) where the rotation speed of the second pump 30 decreases and (1-4) where the third port 96c of the pressure adjusting valve is closed and the output pressure P1 increases, that is, in a responding (restoring) process of the output pressure P1, the concern that the line pressure PH decreases arises.

Meanwhile, the flow in the case where the side pressure correction control is performed is as follows. (2-1) The rotation speed of the second pump 30 decreases. (2-2) The side pressure correction control is implemented. (2-3) The first spool 92a of the line pressure adjusting valve 24 is moved toward the left of the figure. (2-4) The third port 96c of the line pressure adjusting valve 24 is closed, and the output pressure P1 of the first pump 20 increases. (2-5) The bypass valve 58 is opened, and the second state is switched to the first state. Accordingly, at the timing of (2-1) where the rotation speed of the second pump 30 decreases, the side pressure correction control of (2-2) is implemented. Accordingly, the decrease of the line pressure PH that occurs in (1-2) in (a) of FIG. 13 does not occur and is remedied. Therefore, between (2-1) where the rotation speed of the second pump 30 decreases and (2-4) where the third port 96c of the pressure adjusting valve is closed and the output pressure P1 increases, that is, in the responding (restoring) process of the output pressure P1, the line pressure PH can be prevented from decreasing.

Specifically, with the side pressure correction control described herein by changing the indicative oil value with respect to the control valve 68a, the correction hydraulic pressure is added to the hydraulic pressure supplied from the control valve 68a to the regulator valve 52a. Then, since a portion of the hydraulic pressure supplied from the control valve 68a to the regulator valve 52a is also supplied to the line pressure adjusting valve 24, a portion of the correction hydraulic pressure added in the side pressure correction control is supplied to the line pressure adjusting valve 24 via the seventh port 96g. The hydraulic pressure urges the first spool 92a and the second spool 92b of the line pressure adjusting valve 24 to the left direction of the figure. Therefore, in (2-3) above, the first spool 92a can be more quickly moved leftward. Accordingly, with the opening degree (opening area) between the first port 96a and the recess 102c being reduced at an early stage, the output pressure P1 can be more quickly restored. Therefore, the decrease of the line pressure PH (decrease of side pressure) can be prevented as a consequence.

Figure 14:
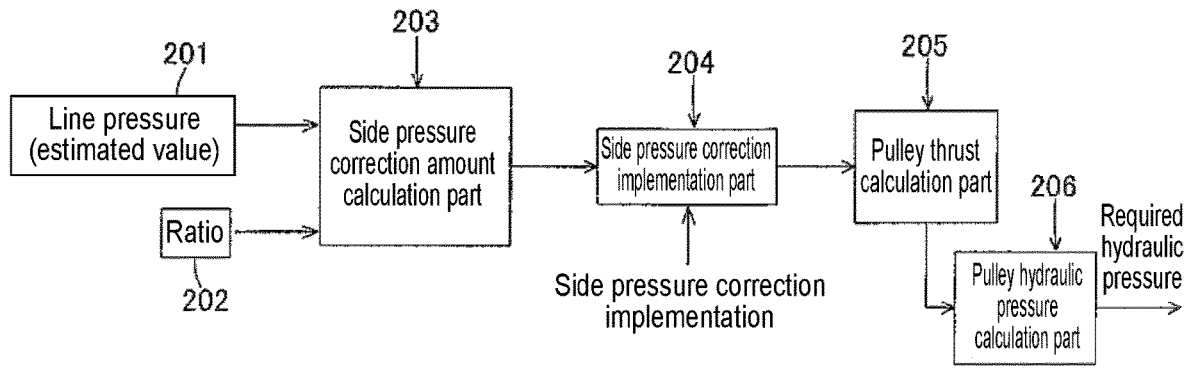
FIG. 14 is a block diagram showing a calculating procedure of a correction hydraulic pressure in the side pressure correction control.
Figure 15:
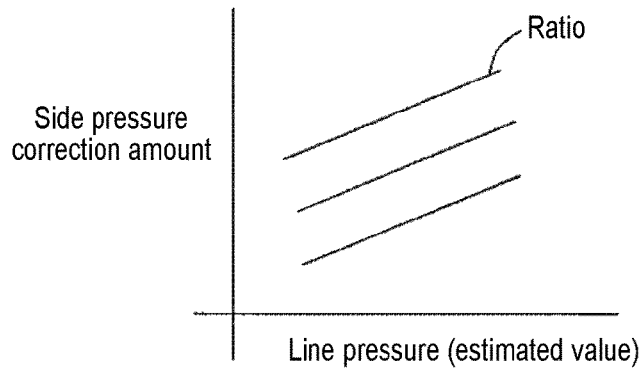
FIG. 15 is a diagram showing a map used for calculating a side pressure correction amount.

FIG. 14 is a block diagram showing a calculating procedure of the correction hydraulic pressure in the side pressure correction control. Here, a side pressure correction amount calculation part 203 uses an estimated value 201 of the line pressure PH and a ratio 202 of the continuously variable transmission mechanism 56 to calculate a side pressure correction amount (torque). The side pressure correction amount (torque) is calculated by using a three-dimensional map showing a relationship between the side pressure correction amount and the line pressure (estimated value) generated for each ratio, as shown in FIG. 15, and searching for a value on the three-dimensional map. Then, the value of the input torque is determined by taking into account a side pressure correction implementation determination result by a side pressure correction implementation determination part 204 with respect to the calculated side pressure correction amount. The side pressure correction implementation determination result taken into account by the side pressure correction implementation part 204 is the result determined under the conditions shown in FIGS. 8 and 12 and the descriptions thereof. Then, a required thrust is calculated by a pulley thrust calculation part 205 from the determined value of the input torque, and the value of the required hydraulic pressure is calculated by a pulley hydraulic pressure calculation part 206 from the value of the required thrust.

Figure 16:
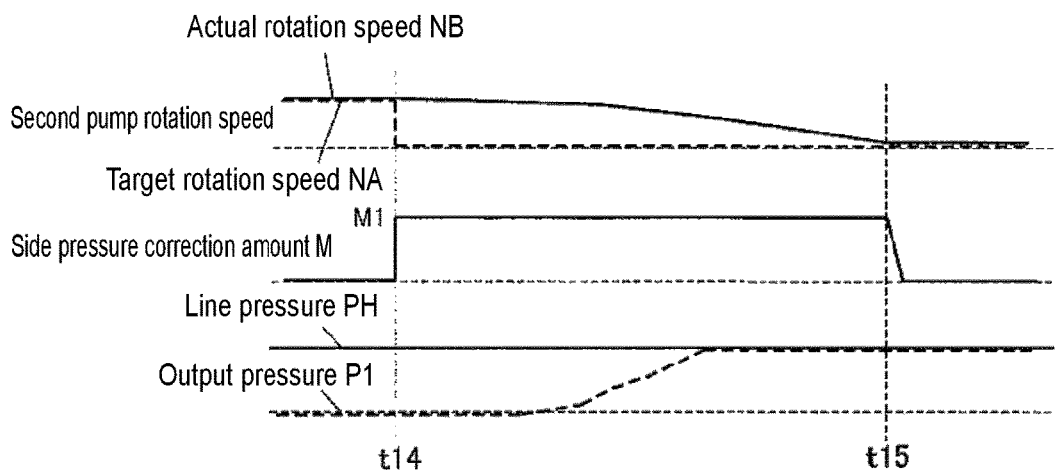
FIG. 16 is a timing chart showing changes in each value when the side pressure correction control is performed.

FIG. 16 is a timing chart showing changes in each value when the side pressure correction control is performed. In the timing chart of the same figure, the respective changes of the target rotation speed NA and the actual rotation speed NB of the second pump 30, the side pressure correction amount M, the line pressure PH, and the output pressure P1 of the first pump 20 over time are shown. Here, at the time point t14 (corresponding to the time point t14 of FIG. 7), by changing the target rotation speed NA of the second pump 30 to the stop rotation speed N2 (≈0), the actual rotation speed NB gradually decreases since then. Then, at the time point t14, the side pressure correction amount M is changed from 0 to a predetermined value M1. The predetermined value M1 is a value calculated in FIG. 14 and the procedure shown and described therein. Then, between the time points t14 and t15, the actual rotation speed NB of the second pump 30 gradually decreases, whereas the output pressure P1 gradually increases to approach the line pressure PH. Afterwards, the side pressure correction control ends at the time point t15. The time point at which the side pressure correction control ends is determined by the stop of the second pump 30 and the opening of the bypass valve 58. That is, if the second pump 30 stops, the operation state of the second pump 30 does not shift (restore), so the side pressure correction control ends.

Further, the side pressure correction amount is controlled to be kept at a constant value (predetermined value MD during the period when the side pressure correction control is implemented, such as between the time point t14 and the time point t15 in FIG. 16. This is because that, assuming that the side pressure correction amount decreases in the state in which the second pump 30 is rotating in the implementation of the side pressure correction control, the first spool 92a of the line pressure adjusting valve 24 shown in FIG. 2 is pushed to the right side of the figure to open the third port 96c and discharge oil via the oil passage 90. Accordingly, the output pressure P1 decreases to return to the operation state of the second pump 30, which needs to be prevented.

As described above, according to the hydraulic control device of the embodiment, the bypass valve 58 and the second pump 30 driven by the motor 32 are connected in parallel between the first pump 20 and the hydraulic operation part, such as the continuously variable transmission mechanism 56. In the hydraulic control device switchable between the first state in which the first oil is supplied from the first pump 20 to the hydraulic operation part via the bypass valve 58 and the second state in which the first oil supplied from the first pump 20 is pressurized by using the second pump 30 and the pressurized first oil is supplied, as the second oil, to the hydraulic operation part, when the second pump 30 is stopped in the second state, the control that gradually decreases the target rotation speed NA of the second pump 30 is performed, and the rates at which the target rotation speed NA of the second pump 30 decreases differ in the case where the second pump 30 is stopped in the operation-allowed region and in the case where the second pump 30 is stopped when the second pump 30 is determined as in the operation-disallowed region.

In addition, in such situation, compared with the case where the second pump 30 is stopped in the operation-allowed region, the rate at which the target rotation speed NA of the second pump 30 decreases is greater in the case where the second pump 30 is stopped when the second pump 30 is determined as in the operation-disallowed region.

According to the hydraulic control device of the embodiment, in the case where the second pump 30 is stopped in the operation-allowed region, by making the rate at which the rotation speed of the second pump 30 decreases smaller, the fuel efficiency of the vehicle can be facilitated. Meanwhile, in the case where the second pump 30 is determined as in the operation-disallowed region, by making the rate at which the target rotation speed NA of the second pump 30 decreases greater than the rate in the case where the second pump 30 is stopped in the operation-allowed region, the rotation speed of the second pump 30 can decrease earlier to ensure the hydraulic function of the hydraulic operation part. Accordingly, by making the rates at which the rotation speed of the second pump 30 decreases different in the case where the second pump 30 is stopped in the operation-allowed region and the case where the second pump 30 is determined as in the operation-disallowed region, the fuel efficiency of the vehicle can be facilitated, while the hydraulic function of the hydraulic operation part can be ensured.

In addition, in the hydraulic control device of the embodiment, a determination on whether the second pump 30 is in the operation-disallowed region is performed based on a size relationship between a hydraulic pressure of dischargeable oil of the second pump 30 and a differential pressure between the estimated value of the line pressure PH, which is a pressure value of the oil supplied to the hydraulic operation part such as the continuously variable transmission mechanism 56, and an estimated value of the low hydraulic pressure P3, which is a pressure value of the oil supplied from the first pump 20 to the torque converter 114, which is another hydraulic operation part, or the lubrication system 108 which operates at a lower pressure. In the case where the hydraulic pressure of the dischargeable oil of the second pump is equal to or less than the differential pressure between the estimated value of the line pressure PH and the estimated value of the low hydraulic pressure P3, the second pump 30 is determined as in the operation-disallowed region.

In the case where the hydraulic pressure of the dischargeable oil of the second pump is equal to or less than the differential pressure between the estimated value of the line pressure PH and the estimated value of the low hydraulic pressure P3, since the hydraulic pressure corresponding to the differential pressure cannot be covered by the operation of the second pump 30, the concern that the energy efficiency cannot be improved through the operation of the second pump 30 arises. Therefore, in such case, by determining the second pump 30 as in the operation-disallowed region, the control that stops the second pump 30 is performed at an earlier stage.

In addition, the hydraulic control device of the embodiment may further includes the output pressure sensor 26 that detects the output pressure P1, which is a pressure of oil on a sucking side of the first oil in the second pump 30, and based on a determination that the output pressure P1 detected by the output pressure sensor 26 has increased to a value substantially consistent with the estimated value of the line pressure PH, which is the pressure value of the oil supplied to the hydraulic operation part such as the continuously variable transmission mechanism 56, the control that gradually decreases the target rotation speed NA of the second pump 30 ends, and the target rotation speed NA of the second pump 30 is decreased until the substantial stop rotation speed N2.

In the case where the output pressure P1 detected by the output pressure sensor 26 is determined as having increased to a value substantially consistent with the estimated value of the line pressure PH supplied to the hydraulic operation part, the hydraulic pressure required by the hydraulic operation part can be covered by the operation of the first pump 20 alone. Therefore, in such case, the control that gradually decreases the target rotation speed NA of the second pump 30 ends by decreasing the target rotation speed NA of the second pump 30 until the substantial stop rotation speed N2. Accordingly, the stop period of the second pump 30 can be suitably determined, and it is possible to facilitate the fuel efficiency.

Although the embodiments of the disclosure have been described above, the disclosure is not limited to the above embodiments, and various modifications can be made within the scopes of claims and the technical concepts described in the specification and drawings. For example, if the control that gradually decreases the target rotation speed of the second pump in the disclosure is the control that decreases the target rotation speed through time, the exact example of the decrease is not limited to the above embodiment, and various examples may be adopted. That is, it suffices as long as the target rotation speed is constantly lower than before in the interval between the start point and the end point of the control. The specific embodiment is not limited to the one in which the target rotation speed decreases linearly through time, but may also be one in which the target rotation speed decreases in stages, or a combination thereof.

What is claimed is:
1. A hydraulic control device, wherein
a bypass valve and a second pump driven by a motor are connected in parallel between a first pump and a hydraulic operation part of a transmission,
the hydraulic control device is configured to be switchable between a first state and a second state, wherein in the first state, a first oil is supplied from the first pump to the hydraulic operation part via the bypass valve, and in the second state, the first oil supplied from the first pump is pressurized by using the second pump, and the first oil that is pressurized is as a second oil and supplied to the hydraulic operation part, wherein when the second pump is stopped in the second state, a control that gradually decreases a target rotation speed of the second pump is performed, and rates at which the target rotation speed of the second pump decreases differ in a case where the second pump is stopped in an operation-allowed region and in a case where the second pump is stopped when the second pump is determined as in an operation-disallowed region.

2. The hydraulic control device as claimed in claim 1, wherein compared with the case where the second pump is stopped in the operation-allowed region, the rate at which the target rotation speed of the second pump decreases is greater in the case where the second pump is stopped when the second pump is determined as in the operation-disallowed region.

3. The hydraulic control device as claimed in claim 1, wherein a determination on whether the second pump is in the operation-disallowed region is performed based on a size relationship between a hydraulic pressure of dischargeable oil of the second pump and a differential pressure between an estimated value of a pressure value of oil supplied to the hydraulic operation part and an estimated value of a pressure value of oil supplied from the first pump to another hydraulic operation part or a lubrication target which operates at a pressure lower than that of the hydraulic operation part.

4. The hydraulic control device as claimed in claim 2, wherein a determination on whether the second pump is in the operation-disallowed region is performed based on a size relationship between a hydraulic pressure of dischargeable oil of the second pump and a differential pressure between an estimated value of a pressure value of oil supplied to the hydraulic operation part and an estimated value of a pressure value of oil supplied from the first pump to another hydraulic operation part or a lubrication target which operates at a pressure lower than that of the hydraulic operation part.

5. The hydraulic control device as claimed in claim 3, wherein the second pump is determined as in the operation-disallowed region in a case where the hydraulic pressure of the dischargeable oil of the second pump is equal to or less than the differential pressure between the estimated value of the pressure value of the oil supplied to the hydraulic operation part and the estimated value of the pressure value of the oil supplied from the first pump to the another hydraulic operation part or the lubrication target which operates at the pressure lower than that of the hydraulic operation part.

6. The hydraulic control device as claimed in claim 4, wherein the second pump is determined as in the operation-disallowed region in a case where the hydraulic pressure of the dischargeable oil of the second pump is equal to or less than the differential pressure between the estimated value of the pressure value of the oil supplied to the hydraulic operation part and the estimated value of the pressure value of the oil supplied from the first pump to the another hydraulic operation part or the lubrication target which operates at the pressure lower than that of the hydraulic operation part.

7. The hydraulic control device as claimed in claim 1, further comprising:

a hydraulic pressure sensor, detecting a pressure of oil on a sucking side of the first oil in the second pump, and based on a determination that an oil pressure detected by the hydraulic pressure sensor has increased to a value substantially consistent with the estimated value of the pressure value of the oil supplied to the hydraulic operation part, the control that gradually decreases the target rotation speed of the second pump ends, and the target rotation speed of the second pump is decreased until a substantial stop rotation speed.

8. The hydraulic control device as claimed in claim 2, further comprising:

a hydraulic pressure sensor, detecting a pressure of oil on a sucking side of the first oil in the second pump, and based on a determination that an oil pressure detected by the hydraulic pressure sensor has increased to a value substantially consistent with the estimated value of the pressure value of the oil supplied to the hydraulic operation part, the control that gradually decreases the target rotation speed of the second pump ends, and the target rotation speed of the second pump is decreased until a substantial stop rotation speed.

9. The hydraulic control device as claimed in claim 3, further comprising:

a hydraulic pressure sensor, detecting a pressure of oil on a sucking side of the first oil in the second pump, and based on a determination that an oil pressure detected by the hydraulic pressure sensor has increased to a value substantially consistent with the estimated value of the pressure value of the oil supplied to the hydraulic operation part, the control that gradually decreases the target rotation speed of the second pump ends, and the target rotation speed of the second pump is decreased until a substantial stop rotation speed.

10. The hydraulic control device as claimed in claim 4, further comprising:

a hydraulic pressure sensor, detecting a pressure of oil on a sucking side of the first oil in the second pump, and based on a determination that an oil pressure detected by the hydraulic pressure sensor has increased to a value substantially consistent with the estimated value of the pressure value of the oil supplied to the hydraulic operation part, the control that gradually decreases the target rotation speed of the second pump ends, and the target rotation speed of the second pump is decreased until a substantial stop rotation speed.

11. The hydraulic control device as claimed in claim 5, further comprising:

a hydraulic pressure sensor, detecting a pressure of oil on a sucking side of the first oil in the second pump, and based on a determination that an oil pressure detected by the hydraulic pressure sensor has increased to a value substantially consistent with the estimated value of the pressure value of the oil supplied to the hydraulic operation part, the control that gradually decreases the target rotation speed of the second pump ends, and the target rotation speed of the second pump is decreased until a substantial stop rotation speed.

12. The hydraulic control device as claimed in claim 6, further comprising:

a hydraulic pressure sensor, detecting a pressure of oil on a sucking side of the first oil in the second pump, and
based on a determination that an oil pressure detected by the hydraulic pressure sensor has increased to a value substantially consistent with the estimated value of the pressure value of the oil supplied to the hydraulic operation part, the control that gradually decreases the target rotation speed of the second pump ends, and the target rotation speed of the second pump is decreased until a substantial stop rotation speed.

* * * * *